United States Patent
Smith et al.

(10) Patent No.: US 7,969,121 B2
(45) Date of Patent: Jun. 28, 2011

(54) POWER SUPPLY THAT USES A SUPERCAPACITIVE DEVICE

(75) Inventors: Trevor Smith, Lane Cove (AU); Pierre Mars, Lane Cove (AU)

(73) Assignee: Cap-XX Limited, Dee Why, NSW (AU)

( * ) Notice: Subject to any disclaimer, the term of this patent is extended or adjusted under 35 U.S.C. 154(b) by 871 days.

(21) Appl. No.: 11/795,916

(22) PCT Filed: Feb. 2, 2006

(86) PCT No.: PCT/AU2006/000126
§ 371 (c)(1),
(2), (4) Date: Oct. 11, 2007

(87) PCT Pub. No.: WO2006/081613
PCT Pub. Date: Aug. 10, 2006

(65) Prior Publication Data
US 2008/0129219 A1    Jun. 5, 2008

(30) Foreign Application Priority Data

Feb. 2, 2005   (AU) ............................... 2005900458
Mar. 11, 2005  (AU) ............................... 2005901197
Aug. 8, 2005   (AU) ............................... 2005904262

(51) Int. Cl.
    *H01M 10/46*   (2006.01)

(52) U.S. Cl. ...................................................... 320/167
(58) Field of Classification Search .................. 320/107, 320/114, 115, 166, 167
    See application file for complete search history.

(56) References Cited

U.S. PATENT DOCUMENTS

| 6,737,830    | B2  | 5/2004  | Bean et al.           |
|--------------|-----|---------|-----------------------|
| 2003/0180037 | A1  | 9/2003  | Sommers               |
| 2004/0263127 | A1* | 12/2004 | Turner et al. .... 320/166 |

FOREIGN PATENT DOCUMENTS

| CN | 1264268 A      | 8/2000  |
| CN | 1456899 A      | 11/2003 |
| DE | 10147235 A1    | 4/2003  |
| EP | 1467417 A2     | 10/2004 |
| JP | 2004-077597 A  | 3/2004  |
| JP | 2004-233714 A  | 8/2004  |
| JP | 2005-173168 A  | 6/2005  |
| WO | WO 03/073161 A2 | 9/2003 |
| WO | WO 2004/100624 A2 | 11/2004 |

* cited by examiner

*Primary Examiner* — Edward Tso
(74) *Attorney, Agent, or Firm* — Kenyon & Kenyon LLP

(57) ABSTRACT

A power supply (1) for powering a load, the load being in the form of a flash driver circuit (4) for a digital camera (not shown). The power supply includes a supercapacitive device, in the form of a supercapacitor (8), for powering circuit (4). A regulator unit, in the form of an inductive regulator (10), charges supercapacitor (8).

20 Claims, 12 Drawing Sheets

Figure 3
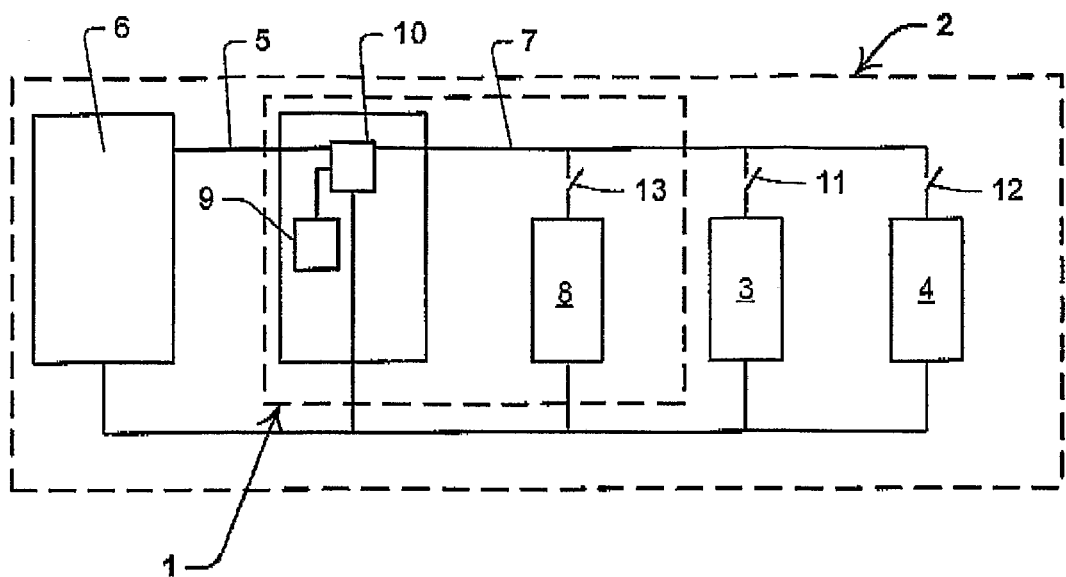
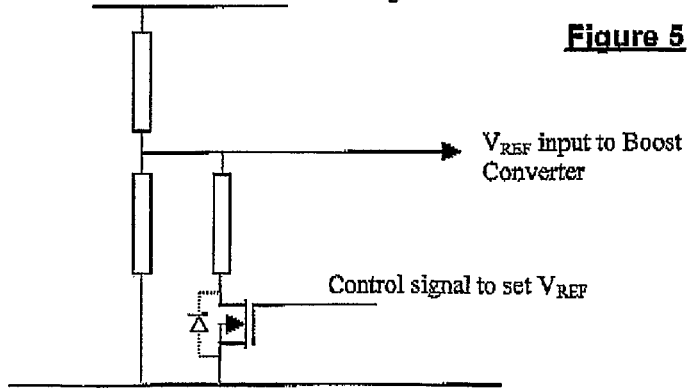
Figure 5

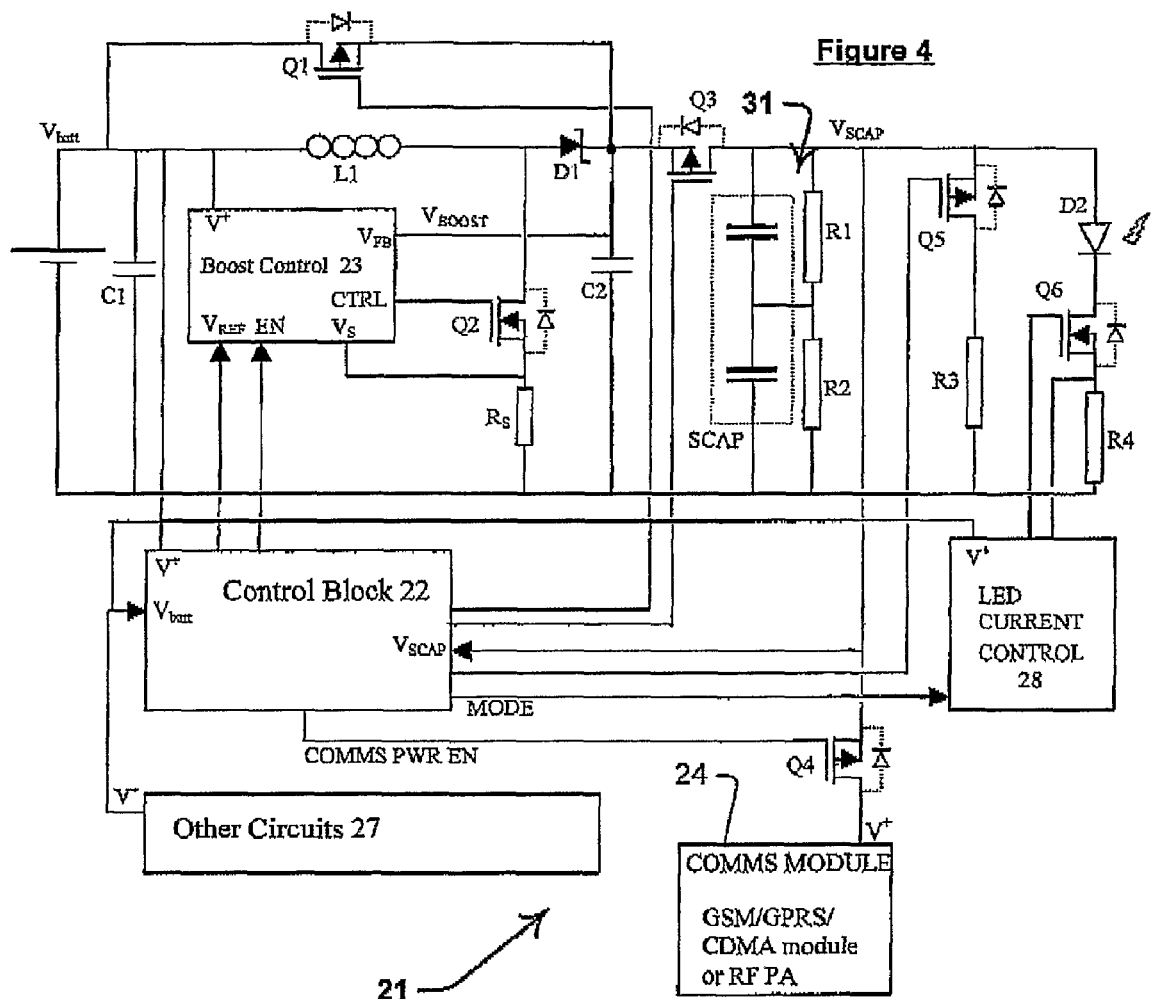

Figure 7
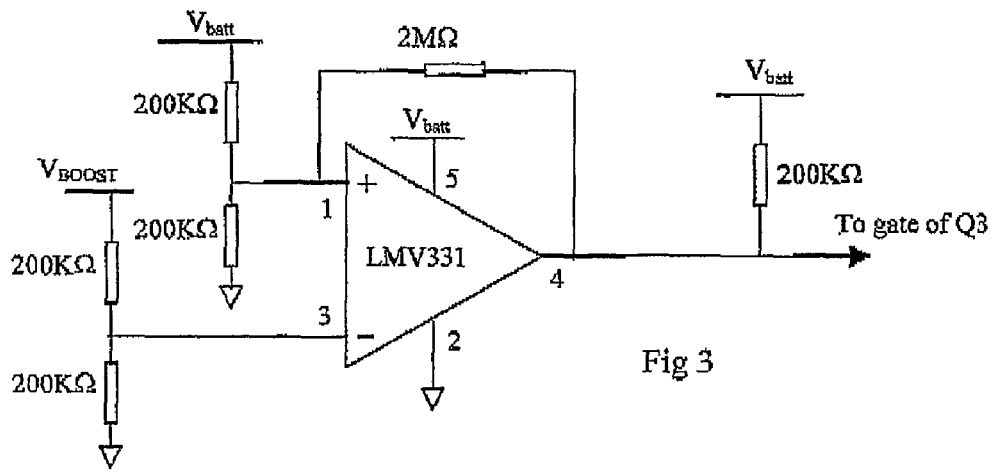
Fig 3
Figure 8
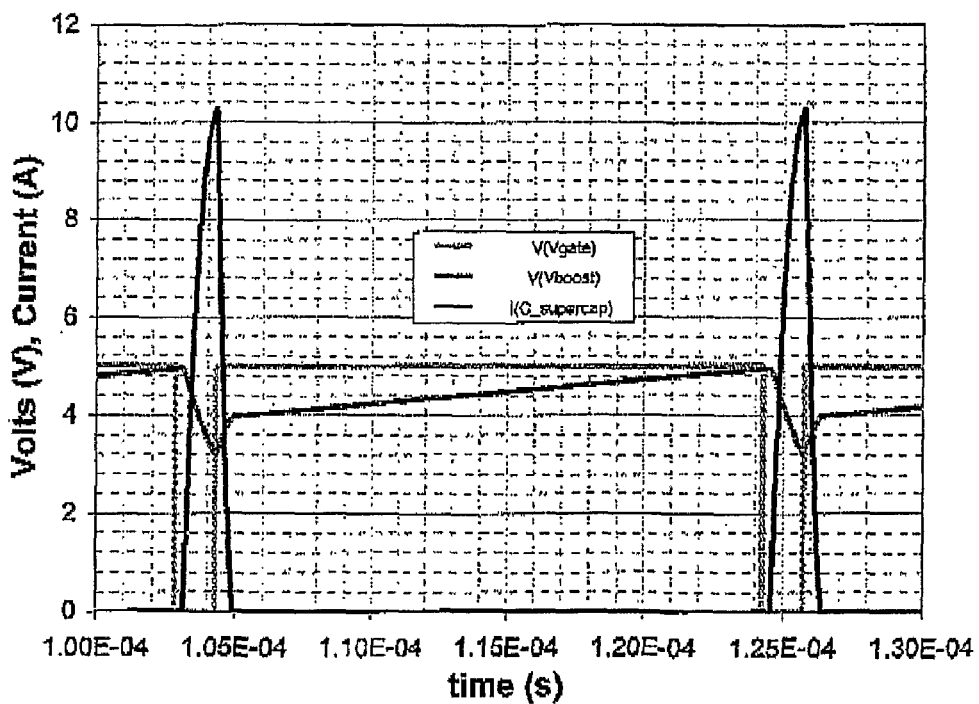

POWER SUPPLY THAT USES A SUPERCAPACITIVE DEVICE

This is a 371 national phase application of PCT/AU2006/000126 filed 02 Feb. 2006, which claims priority to Australian Patent Applications No. 2005900458 filed 02 Feb. 2005, No. 2005901197 filed 11 Mar. 2005, and No. 2005904262 filed 08 Aug. 2005, respectively, the contents of which are incorporated herein by reference.

BACKGROUND TO THE INVENTION

The present invention relates to a power supply and in particular to a power supply for powering at least one load.

The invention has been developed primarily for use in a portable electronic device such as a cellular telephone having an onboard digital camera with a flash, and will be described herein after with reference to that application. It will be appreciated that the invention is not limited to that particular field of use and is also applicable to other portable electronic devices such as a PDA, a laptop computer, a digital camera, MP3 player or other computing devices having a plurality of loads with respective peak power demands at one or more nominal voltages, whether those devices are portable or not. The invention is also applicable to high power devices such as hybrid electric vehicles and electric vehicles.

DISCUSSION OF THE PRIOR ART

Portable electronic devices include an onboard power source for powering the electronic circuitry that is included within the device. Conventionally, the power source is a secondary battery or a number of such batteries. The design of these portable devices is usually particularly sensitive to the size of the device, the effective operational time required between having to recharge the battery or batteries, the functionality that is able to be provided, and the cost of the parts required to construct the device. Typically, the tendency is for the size to be small, the operational time to be longer, the functionality to be increased, and the cost to be reduced. It will be appreciated that these tendencies are in opposition to each other. For example, one option to achieve a longer operational time is to include a larger capacity battery which, for the provision of given functionalities, usually increases both the size of the device and the cost.

With the increasing convergence of technologies in portable devices—that is, the inclusion within a given device of additional functionalities and the hardware and circuitry required to provide those functionalities—there is a demand for higher battery load currents, and in particular for higher battery peak load currents. This arises typically as the battery must simultaneously supply current to the separate circuits that provide the respective functionalities. In an attempt to address is conflict, a partial solution has been found which involves only allowing the mutually exclusive use of the different functionalities. Notwithstanding, the peak load currents are often still high, and the runtime of the device is still considerably affected, due to the standby current that is drawn by the circuits not presently in use. This is particularly problematic with those devices offering cellular telephony.

Previous efforts of reducing peak battery current have included placing a supercapacitor in parallel to the battery, or with some current limit circuit between the battery and supercapacitor to limit the inrush current to a discharged supercapacitor. In his case, and particularly where one of the loads being supplied is a high current LED Flash, the supercapacitor is at the input to the LED Flash diver, This results in the LED Flash driver having to support very high currents and make implementation impractical in small portable applications such as cell phones.

Any discussion of the prior art throughout the specification should in no way be considered as an admission that such prior art is widely known or forms part of common general knowledge in the field.

DISCLOSURE OF THE INVENTION

It is an object of the present invention to overcome or ameliorate at least one of the disadvantages of the prior art, or to provide a useful alternative.

The term "supercapacitive device", as used in this specification, is intended to include those energy storage devices that are generally referred to as a "supercapacitors" are Supercapacitive devices store charge in an electric field and typically have a high capacitance and a high power density. It will be appreciated that "supercapacitors" are also designated by terms such as "ultra capacitors", "electric double layer capacitors" and "electrochemical capacitors", amongst others, all of which are included within the term "supercapacitive device" as used within this specifications A sub-set of supercapacitive devices are so-called "hybrid devices" that include supercapacitive elements in combination with either fuel cell elements or battery elements. For example, a hybrid supercapacitor/battery typically includes a single package in which are included elements for storing energy in one or more electric fields and in one or more electrochemical cells; In some instances, a supercapacitive device includes a plurality of supercapacitive cells that are connected in series or parallel, or a combination of both. Indeed, for the purpose of this specification, a supercapacitive device is intended to include any reasonable combination of supercapacitors and other components that produces a net supercapacitive effect. It is not unusual for such "multi cell" supercapacitive devices to include other elements for balancing the voltages that are maintained on the respective cells. These other elements include active and/or passive electronic components.

According to a first aspect of the invention there is provided a power supply for powering at least one load, the power supply including:

a supercapacitive device for powering the at least one load; and a regulator unit for charging the supercapacitive device.

Preferably the regulator unit limits the charging current of the supercapacitor to a first predetermined value. More preferably the predetermined value is less than about 2 Amps. Even more preferably the predetermined value is less than about 1 Amp. Still more preferably the predetermined value is less Chan about 100 mA In other embodiments, however, the predetermined value is other than about 2 Amps.

Preferably the power supply unit limits the current of the battery to a second predetermined value. More preferably the predetermined value is less than about 2 Amps. In other embodiments, however, the second predetermined value is other than about 2 Amps.

Preferably, the regulator unit includes a voltage regulator. More preferably, the voltage regulator is a voltage booster. In other embodiments, however, the voltage regulator is a step-down regulator, for example a linear regular or a buck regulator.

Preferably, the power supply includes an input for selectively connecting the regulator to a power source. Preferably also, the input isolates the regulator from the power source when the supercapacitive device is powering the or each load. In some embodiments, tee supercapacitive device is in parallel with at least one load. Preferably also, the regulator draws charging current for the supercapacitive device limited to a predetermined value from the power source when the supercapacitive device is powering the or each load. In some embodiments, the supercapacitive device is in parallel with at least one load. More preferably, in these embodiments the regulator is in series with the power source and together these are in parallel with the supercapacitive device. In alternative embodiments, however, the supercapacitive device is in series with the power source. That is, in the alternative embodiments the series combination of the supercapacitive device and the power source are together in parallel with the load. In still filter embodiments, the supercapacitive device is selectively connected in parallel and series with the power source.

In a preferred embodiment the power supply draws from the power source a power supply current and the at least one load includes two pulsed loads that draw respective load currents from the power supply, wherein the power supply contains the power supply current to less than a predetermined threshold. Typically, the supercapacitive device enables the power supply to satisfy the pulsed loads while the power supply current remains at less than the predetermined threshold:

More preferably, at least one of the load currents is controlled to contain the power supply current to less than the predetermined threshold. However, in some embodiments the supercapacitive device supplies all or most of the load current and enables load currents that are much higher than the predetermined maximum current that can be supplied by the power source. In a preferred form, where there is more than one pulsed load, one of the loads has a high priority and the other of the loads has a low priority, wherein to contain the power supply current the regulator unit preferentially controls the load current for the load having a lower priority. In other embodiments, both load currents are controlled. In further embodiments, the priority of the loads changes over lime or following configuration by a user. Preferably also, one of the loads is a cellular telephone transmitter circuit and another of the loads is a flash circuit. More preferably, the cellular telephone circuit has a high priority and the flash circuit has a low priority. While both loads are able to simultaneously operate—notwithstanding that the loads will only mutually exclusively draw respective load currents—the power supply current is contained by ensuring that the load current to the flash circuit is controlled, or alternatively the load current to the flash circuit is supplied by the supercapacitive device and the power supply current contribution to the flash circuit is controlled. The control of the load current to the flash circuit is responsive to the load current being drawn by the cellular telephone circuit. That is, when a load current is being drawn by the cellular telephone circuit, the load current to the flash circuit is reduced to be substantially zero. That is, at all times the power supply current is maintained below the predetermined threshold, and in so far as both the high priority load and the low priority load simultaneously demand load currents that would result in that threshold being exceeded, the low priority load current is reduced. In some embodiments, the low priority load current is reduced to a portion of what would have otherwise been provided in the absence of the high priority load current, while in other embodiments the low priority load current is reduced to substantially zero. In other embodiments the high priority load can be supplied directly from the power source while the low priority load is supplied by the power supply.

Preferably, the power supply includes a regulator for powering at least one other of the loads.

According to a second aspect of the invention, there is provided a power supply including:

a regulator unit for powering a first load; and a supercapacitive device chargeable by the regulator unit for powering a second load.

Preferably charging the supercapacitive device and powering the second load are performed mutually exclusively. More preferably, the power supply is included within a cellular telephone having a communications module and a flash drive circuit respectively defining and the first and the second loads.

Preferably, the power supply includes an input for commenting to a power source. In some embodiments, the supercapacitive device is in parallel with at least one load. More preferably, in these embodiments the regulator is in series with the power source and together these are in parallel with the supercapacitive device. In alternative embodiments, however, the supercapacitive device is in series with the power source. That is, in the alternative embodiments the series combination of the supercapacitive device and the power source are together in parallel with the load. In still further embodiments, the supercapacitive device is selectively connected in parallel and series with the power source.

In some embodiments, the first and second loads are mutually exclusively powered. In other embodiments the first and second loads are powered simultaneously. Preferably the second load is a pulsed load.

Preferably, the power supply is selectively operable in a plurality of modes, including:

a first mode in which the regulator unit powers the first load;

a second mode in which the regulator unit charges the supercapacitive device; and a third mode in which the supercapacitive device is discharged to power the second load.

Preferably, the supercapacitive device is, in the first mode, isolated from the power source. Also preferably, the regulator unit does not supply charge current to the supercapacitor in the third mode. Also preferably, the first load is powered in the second and third modes. As such, the regulator unit ensures the current drawn from the power source to supply the supercapacitive device in the second mode or the second load in the third mode is limited so the power source can fully supply the first load. In some embodiments, the first load is isolated from the power source in the second and third modes.

Preferably the regulator unit limits the charging current of the supercapacitor to a predetermined value. More preferably the predetermined value is less than about 2 Amps. Even more preferably the predetermined value is less than about 1 Amp, Still more preferably the predetermined value is less than about 100 mA.

In some embodiments, the regulator unit is a voltage regulator. Preferably the voltage regulator boosts the voltage supplied by the power source.

In some embodiments, the regulator unit includes a voltage regulator and a bypass circuit. Preferably, the bypass circuit and voltage regulator are mutually exclusively utilised. More preferably, the bypass circuit is utilised in the first mode, and the voltage regulator is utilised in the second mode. It will be appreciated that the regulator unit can be isolated from the power source in the third mode, or the regulator unit can still supply limited charging current to the supercapacitive device in the third mode.

According to a third aspect of the invention there is provided a power supply for powering a plurality of loads, the power supply including:

an input for connecting to a power source;

a first output for connecting to a first load;

a second output for connecting to a second load;

a supercapacitive device that is connected to at least one of the outputs for powering the respective load; and a regulator unit connected to the input for charging the supercapacitive device.

Preferably, the first output defines the second output.

Preferably the regulator unit limits the charging current of the supercapacitor to a predetermined value. More preferably the predetermined value is less than about 2 Amps. Even more preferably the predetermined value is less than about 1 Amp. Still more preferably the predetermined value is less than about 100 mA.

In some embodiments, the supercapacitive device is in parallel with the second load. More preferably, in these embodiments the regulator is in series with the power source and together these are in parallel with the supercapacitive device. In alternative embodiments, however, the supercapacitive device is in series with the input. That is, in these alternative embodiments the series combination of the supercapacitive device and the power source are together in parallel with the load. In still further embodiments, the supercapacitive device is selectively connected in parallel and series with the power source.

Preferably the regulator unit is selectively operable in a plurality of modes, including:

a charging mode wherein the regulator unit charges the supercapacitive device; and a discharging mode wherein the supercapacitive device is discharged to power the second load.

Preferably, the regulator unit is, in the discharging mode, isolated from the supercapacitive device.

In some embodiments the first and second loads are mutually exclusively powered. In other embodiments the first and second loads are powered simultaneously.

According to a fourth aspect of the invention there is provided a power supply for a plurality of loads that draw respective load currents, the power supply including:

an input for connecting to a power source that provides a predetermined maximum source current at a source voltage within a predetermined range;

an output for selectively connecting with the loads and providing an output voltage;

a supercapacitive device in parallel with the output; and a control circuit disposed between the input and the output for controlling the output voltage such that the load currents are provided while maintaining the source current at less than a predetermined value.

Preferably, at least one of the loads is a pulsed load In other embodiments, one or more of the loads are pulsed loads that toggle between a standby mode and an operable mode where the load current is respectively relatively low and relatively high. More preferably, the pulse Loads have a duty cycle of less than about 50%. Even more preferably, for any given time interval, only one of the load currents will be at or near its peak vale and, simultaneously, the currents drawn by any other loads will be at or near their quiescent current levels. That is, during any given load cycle, the average power drawn by the all the loads is less than the predetermined maximum source current multiplied by the source voltage.

Even more preferably, the supercapacitive device contributes to at least one of the load currents. In some embodiments, the supercapacitive device contributes to all of the load currents. In embodiments where at least one of the loads is a pulsed load, the supercapacitive device preferably has sufficient capacity to supply the total of the load currents for one cycle of the pulsed load while receiving current from the source up to its predetermined value and maintaining sufficient voltage for the loads to operate. It will be appreciated that in some embodiments, for a given time interval, that only a single load will have a non-zero value. In this Instance, the capacity of the supercapacitive device need only be sufficient to supply a single cycle of the load demanding the most energy during such a cycle.

Preferably also, at least one of the loads is connected to the output by a switch that progresses between an open and a closed configuration for isolating and connecting that load respectively from and with the output. That is, when the switch is in the open configuration and the load is isolated from the output—in that that load is not enabled—the load current for that load will be zero. Conversely, when the switch is in the closed configuration and the respective load is connected with the output—in that that load is enabled—the load current for that load will be non-zero. In a preferred embodiment, the switch is responsive to the control circuit for progressing between the open and closed configurations. This enables the voltage presented to the loads to be varied. If the voltage required to drive one load is too high for any of the other loads, those any other loads are disconnected to reduce the risk of damage to them. Preferably, the switch is a transistor, and more preferably a FET.

In some embodiments, the supercapacitive device is always electrically connected to the output. In other embodiments, however, the supercapacitive device is selectively electrically disconnected from the output. More preferably, the supercapacitive device is selectively electrically disconnected from the output in response to the sum of the load currents being below a predetermined threshold for a predetermined period. This saves the supercapacitor leakage current and any supercapacitor balancing circuit current used in conjunction with multi-cell supercapacitors from draining energy from the power source. Accordingly, for electronic devices having a power source including a secondary battery, the runtime of the device is increased.

Preferably, the loads include respective operating voltages, and at least one of those operating voltages differs from all the other operating voltages. That is, the loads draw respective load currents $I_1, I_2, \ldots I_N$ at operating voltages $V_1, V_2, \ldots V_N$, where $N \geq 2$ and $V_1 \neq V_2$, and, ..., and $V_1 \neq V_N$. More preferably, the control circuit controls the output voltage to selectively provide $V_1, V_2, \ldots V_N$ at the output.

In a preferred form, at least one of $V_1, V_2, \ldots V_N$ is greater than the predetermined source voltage. More preferably, the control circuit includes a regulator that is operable to selectively maintain the output voltage at or about the at least one of $V_1, V_2, \ldots V_N$ that is greater than the source voltage. Even more preferably, the regulator is selectively disabled and bypassed with a switch if the source voltage is greater than the selected one of $V_1, V_2, \ldots V_N$. In preferred embodiments the switch is a FET, while in other embodiments alternative transistors are used. In some embodiments the regulator is a boost circuit, while in other embodiments the regulator is a buck-boost circuit. If a buck-boost circuit is used, there is no need to bypass the regulator with a switch if the source voltage is greater than the required load voltage. This eliminates the switch and its associated control logic.

In the preferred embodiments, the predetermined source voltage varies with time. More preferably, the power source is a battery or a battery pack, or an AC adaptor, for a portable electronic device and the loads are respective circuits of that portable electronic device. It will be appreciated that the voltage supplied from a battery or battery pack varies considerably with time due to the discharge characteristics of the batty or batteries, the internal resistance of the battery or batteries, and any associated electronic protection circuitry used in the battery pack. The voltage supplied by an AC adaptor will also be different from the voltage supplied by a battery or battery pack.

In other embodiments, the power source is a fuel cell or other portable store of energy. In further embodiments, the power source is a mains power source. More preferably, the power source is a regulated power source.

According to a fifth aspect of the invention there is provided a power supply for a plurality of loads that draw respective load currents $I_1, I_2, \ldots I_N$, where $N \geq 2$, the power supply including:

an input for connecting to a power source that provides a source voltage $V_S$ within a predetermined range at a predetermined maximum source current $I_S$;

an output for selectively connecting with one or more of the loads for providing the load currents $I_1, I_2, \ldots I_N$ at respective predetermined load voltages $V_1, V_2, \ldots V_N$, wherein $V_1 \neq V_2$, and, ..., and $V_1 \neq V_N$;

a supercapacitive device in parallel with the output; and a control circuit disposed between the input and the output for selectively applying one of $V_1, V_2, \ldots V_N$ to the output.

Preferably, one or more of $V_1, V_2, \ldots$ and $V_N \geq V_S$. More preferably, the loads are selectively connected to the output only if the load accepts the voltage at the output. Accordingly, in some embodiments, the loads are all mutually exclusively connected to the output, while in other embodiments more than one load is simultaneously connected to the output.

According to a sixth aspect of the invention there is provided a power supply including:

an input for connecting to a power source that provides a source voltage within a predetermined range at a source current;

an output for connecting with a load that draws a pulsed load current ($I_{L1}$) having a peak value ($I_{LP}$);

a control circuit disposed between the input and the output for supplying to the output an output current ($I_O$) having a predetermined peak value ($I_{OP}$), wherein $I_{OP} < I_{LP}$; and a supercapacitive device in parallel with the output for providing a capacitive current ($I_C$) that maintains $I_{LP} = (I_{OP} + I_C)$.

Typically, it follows from $I_{LP} = (I_{OP} + I_C)$ that $I_{OP} < I_{LP}$ and $I_{OP} <$ a predetermined maximum value. In some cases $I_{OP} = 0$ during discharge of a pulsed load.

Preferably, the output selectively connects with another load that draws a pulsed load current ($I_{L2}$), and the supercapacitive device provides a capacitive current ($I_C$) that maintains $(I_{LP} + I_{L2}) \leq (I_{OP} + I_C)$.

According to a seventh aspect of the invention there is provided a power supply including:

an input for connecting to a power source that provides a source voltage within a predetermined range;

an output for providing an output voltage and for connecting with a load that draws a load current at the output voltage;

a supercapacitive device connected in parallel with the output; and a control circuit disposed between the input and the output for progressing between a first state and a second state in which the output voltage substantially equals the source voltage and is a regulated form of the source voltage respectively.

Preferably, in the first state the source voltage is applied substantially directly to the output. More preferably, the control circuit includes a switch between the input and the output that is closed during the first state and open during the second state respectively. In the preferred embodiment the switch is a FET, while in other embodiments alternative switches are used.

Preferably also, the control circuit includes a regulator that is selectively operable for maintaining the output voltage at a predetermined value. More preferably, the operation of the regulator is selected to coincide with the second state. In some embodiments, when the control circuit is in the second state, the output voltage is greater than the source voltage. That is, the regulator is a boost converter. In other embodiments the output voltage is lower or higher than the source voltage. That is, the regulator is a buck-boost regulator. In further embodiments the output voltage is less than the source voltage and the regulator is a higher voltage regulator. In embodiments where the regulator is a buck-boost regulator, the regulator automatically takes care of the transition from the first to the second state. The regulator remains enabled and there is no need for a bypass switch. This saves on the bypass switch and associated control logic, although at the cost of a small efficiency loss of having to still use the buck-boost regulator during the first state.

According to a eighth aspect of the invention there is provided a power supply including:

an input for connecting to a power source that provides a source voltage within a predetermined range;

an output for providing an output voltage and for connecting with a load that draws a load current at the output voltage;

a supercapacitive device that progresses between a first state and a second state in which it is and is not connected in parallel with the output; and a control circuit disposed between the input and the output and which is responsive to the source voltage for generating the output voltage, the circuit also progressing the supercapacitive device between the first state and the second state.

Preferably, the control circuit is responsive to one or more of the source voltage and the output voltage for progressing the supercapacitive device from one of the states to the other. More preferably, the control circuit is responsive to both of the source voltage and the output voltage for progressing the supercapacitive device from one of the states to the other. In other embodiments, the control circuit is responsive to the load current for progressing the supercapacitive device from one of the states to the other.

According to a ninth aspect of the invention there is provided a power supply including:

an input for connecting to a power source that provides a source voltage within a predetermined range;

an output for providing an output voltage selected from a range of voltages containing the source voltage, the output connecting with one or more loads;

a supercapacitive device connected in parallel with the output; and a control circuit disposed between the input and the output and being responsive to the source voltage for generating the output voltage and limiting the output current to a predetermined maximum.

Preferably, the control circuit limits the output current to a predetermined maximum even when the output voltage is less than the source voltage. More preferably, the control circuit includes: a regulator in the form of a boost converter having an inductor, a FET or other transistor in series with the boost converter; and a diode in series with the transistor. This prevents high currents flowing to the supercapacitive device until the output voltage is high enough That is, forward conduction of current cannot take place from the source through the inductor and diode of the boost converter and to the supercapacitor. This prevents excessive inrush current when charging the supercapacitor, and maintains the source current below the pre-determined maximum.

According to a tenth aspect of the invention, there is provided a method for powering a load from a power source, the method including the steps of:

electrically connecting a supercapacitor and a regulator unit intermediate the power source and the load;

charging the supercapacitor with the regulator unit; and discharging the supercapacitor to power the load.

Preferably the regulator unit limits the charging current of the supercapacitor to a predetermined value. More preferably the predetermined value is less than about 2 Amps. Even more preferably the predetermined value is less than about 1 Amp. Still more preferably the predetermined value is less than about 100 mA.

Preferably, the regulator unit includes a voltage regulator. More preferably, the voltage regulator is a voltage booster. In some embodiments, the regulator unit is isolated from the power source when the supercapacitive device is powering the or each load.

In some embodiments, the supercapacitive device is in parallel with at least one load. More preferably, in these embodiments the regulator is in Series with the power source and together these are in parallel with the supercapacitive device. In alternative embodiments, however, the supercapacitive device is in series with the power source. That is, in the alternative embodiments the series combination of the supercapacitive device and the power source are together in parallel with the load. In still further embodiments, the supercapacitive device is selectively connected in parallel and series with the power source.

According to an eleventh aspect of the invention, there is provided a method for powering a first load and a second load, the method including:

powering the first load with a regulator unit; and powering a second load with a supercapacitive device that is chargeable by the regulator unit.

According to a twelfth aspect of the invention there is provided a method for supplying power to a plurality of loads, the method including:

connecting an input to a power source;

connecting a first output to a first load;

connecting a second output to a second load;

connecting a supercapacitive device to at least one of the outputs for powering the respective load; and connecting a regulator unit to the input for charging the supercapacitive device.

According to a thirteenth aspect of the invention there is provided a method for supplying power to a plurality of loads that draw respective load currents, the method including:

connecting an input to a power source that provides a predetermined maximum source current at a source voltage within a predetermined range;

selectively connecting an output with the loads and providing an output voltage;

providing a supercapacitive device in parallel with the output; and disposing a control circuit between the input and the output for controlling the output voltage such that the load currents are provided while maintaining the source current at less than a predetermined value.

According to a fourteenth aspect of the invention there is provided a method of supplying power to a plurality of loads that draw respective load currents $I_1, I_2, \ldots I_N$, where $N \geq 2$, the method including:

connecting an input to a power source that provides a source voltage $V_S$ within a predetermined range at a source current with a predetermined maximum value $I_S$;

selectively connecting an output with one or more of the loads for providing the load currents $I_1, I_2, \ldots I_N$ at respective predetermined load voltages $V_1, V_2, \ldots V_N$, wherein. $V_1 \neq V_2$, and, ..., and $V_1 \neq V_N$;

providing a supercapacitive device in parallel with the output; and disposing a control circuit between the input and the output for selectively applying one of $V_1, V_2, \ldots V_N$ to the output.

According to a fifteenth aspect of the invention there is provided a method of supplying power including:

connecting an input to a power source that provides a source voltage win a predetermined range at a source current;

connecting an output with a load that draws a pulsed load current ($I_{L1}$) having a peak value ($I_{LP}$);

disposing a control circuit between the input and the output for supplying to the output an output current ($I_O$) having a predetermined peak value ($I_{OP}$), wherein $I_{OP} < I_{LP}$; and providing a supercapacitive device in parallel with the output for providing a capacitive current ($I_C$) that maintains $I_{LP} \leq (I_{OP} + I_C)$.

According to a sixteenth aspect of the invention there is provided a method of supplying power including:

connecting an input to a power source that provides a source voltage within a predetermined range;

providing an output voltage at an output that is connected with a load that draws a load current at the output voltage;

connecting a supercapacitive device connected in parallel with the output; and disposing a control circuit between the input and the output for progressing between a first state aid a second state in which the output voltage substantially equals the source voltage and is a regulated form of the source voltage respectively.

According to a seventeenth aspect of the invention there is provided a method of supplying power, the method including:

connecting an input to a power source that provides a predetermined source voltage;

providing an output voltage at an output that is connected with a load that draws a load current at the output voltage;

progressing a supercapacitive device between a first state and a second state in which it is and is not connected in parallel with the output; and disposing a control circuit between the input and the output for being responsive to the source voltage for generating the output voltage, the circuit also progressing the supercapacitive device between the first state and the second state.

According to an eighteenth aspect of the invention there is provided a method for supplying power, the method including:

connecting an input to a power source that provides a source voltage within a predetermined range;

providing at an output an output voltage that is selected from a range of voltages containing the source voltage, the output connecting with one or more loads;

connecting a supercapacitive device in parallel with the output; and disposing a control circuit between the input and the output and being responsive to the source voltage for generating the output voltage and limiting the output current to a predetermined maximum.

According to a nineteenth aspect of the invention there is provided a power supply for a cellular telephone having a first load and a LED flash, the power supply including:

an input for connecting to a power source;

a first output for connecting to the first load;

a second output for connecting to the LED flash;

a supercapacitive device that is connected to the second output for powering the LED flash; and a regulator unit connected to the input for charging the supercapacitive device.

In some embodiments the regulator is in series with the power source, and together these are in parallel with the supercapacitive device. In other embodiments the supercapacitive device is in series with the input such that the supercapacitive device and the power source are together in parallel with the LEI) flash.

Preferably the power supply is operable in a plurality of modes including:

a charging mode for charging the supercapacitive device; and a discharging for discharging the supercapacitive device to power the LED flash.

In some embodiments the charging and discharging modes operate simultaneously. In other embodiments the charging and discharging mode modes selectively operate mutually exclusively. Preferably the first load is powered irrespective of whether the power supply is in the charging or discharging mode.

Preferably the regulator unit limits the charging current for the supercapacitor to less a predetermined value. More preferably the predetermined value is about 2 Amps. Still more preferably the predetermined value is about 1 Amp.

Preferably the power supply limits the current drawn from the power source to a predetermined value. Preferably the predetermined value is about 2 Amps. More preferably the predetermined value is about 1 Amp.

In some embodiments the first output defines the second output. In further embodiments the first output selectively defines the second output.

In some embodiments the first load is a communications module. In some embodiments the first load is a power amplifier.

According to a twentieth aspect of the invention there is provided a power supply for an LED flash, the power supply including:

an input for connecting to a power source;
an output for connecting to the LED flash;
a supercapacitive device that is connected to output for powering the LED flash; and;
a regulator unit connected to the input for charging the supercapacitive device.

According to a Her aspect of the invention there is provided a power supply for a plurality of loads that draw respective load currents $I_1, I_2, \ldots I_N$, where $N \geq 2$, the power supply including:

an input for connecting to a power source that provides a Hum source voltage $V_S$;

an output for selectively connecting with one or more of the loads for providing the load currents $I_1, I_2, \ldots I_N$ at respective predetermined load voltages $V_1, V_2, \ldots V_N$, wherein $V_1 \neq V_2$, and, $\ldots$, and $V_1 \neq V_N$;

a supercapacitive device in parallel with the output; and
a control circuit disposed between the input and the output for selectively applying one of $V_1, V_2, \ldots V_N$ to the output.

Preferably one or more of $V_1, V_2, \ldots$ and $V_N \geq V_S$.

BRIEF DESCRIPTION OF THE DRAWINGS

A preferred embodiment of the invention will now be described, by way of example only, with reference to the accompanying drawings in which:

FIG. 3 is schematic representation of a power supply according to an embodiment of the invention;

FIG. 4 is a schematic representation of a power supply according to another embodiment of the invention;

FIG. 5 is a schematic representation of a variable resistive divider for providing a reference voltage to a boost controller of the circuit of Figure;

Figure 2:
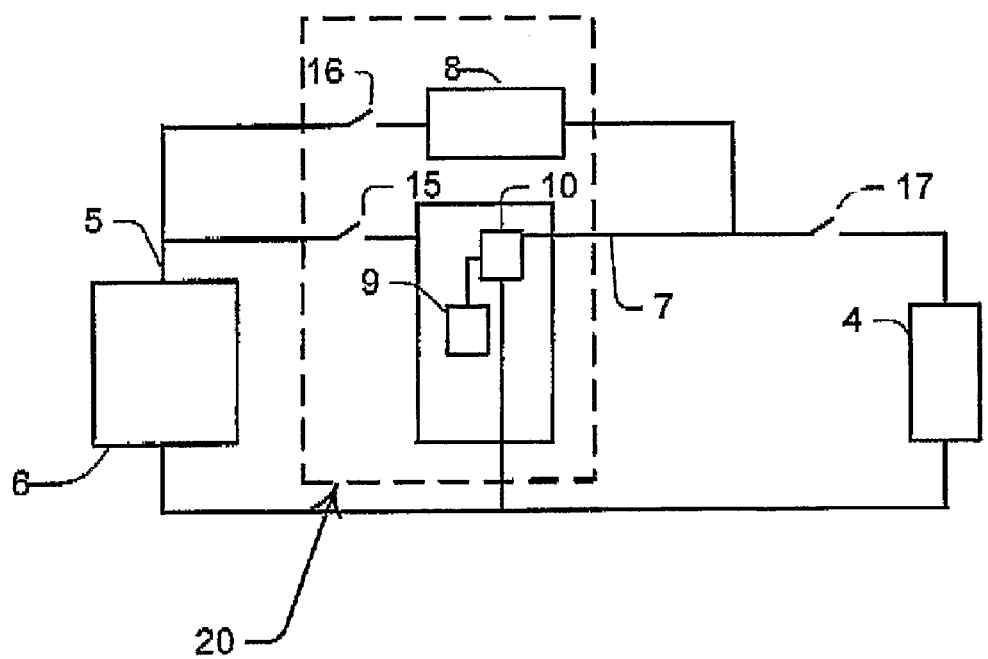
FIG. 2 is a schematic representation of a power supply according to another embodiment of The invention.
Figure 6:
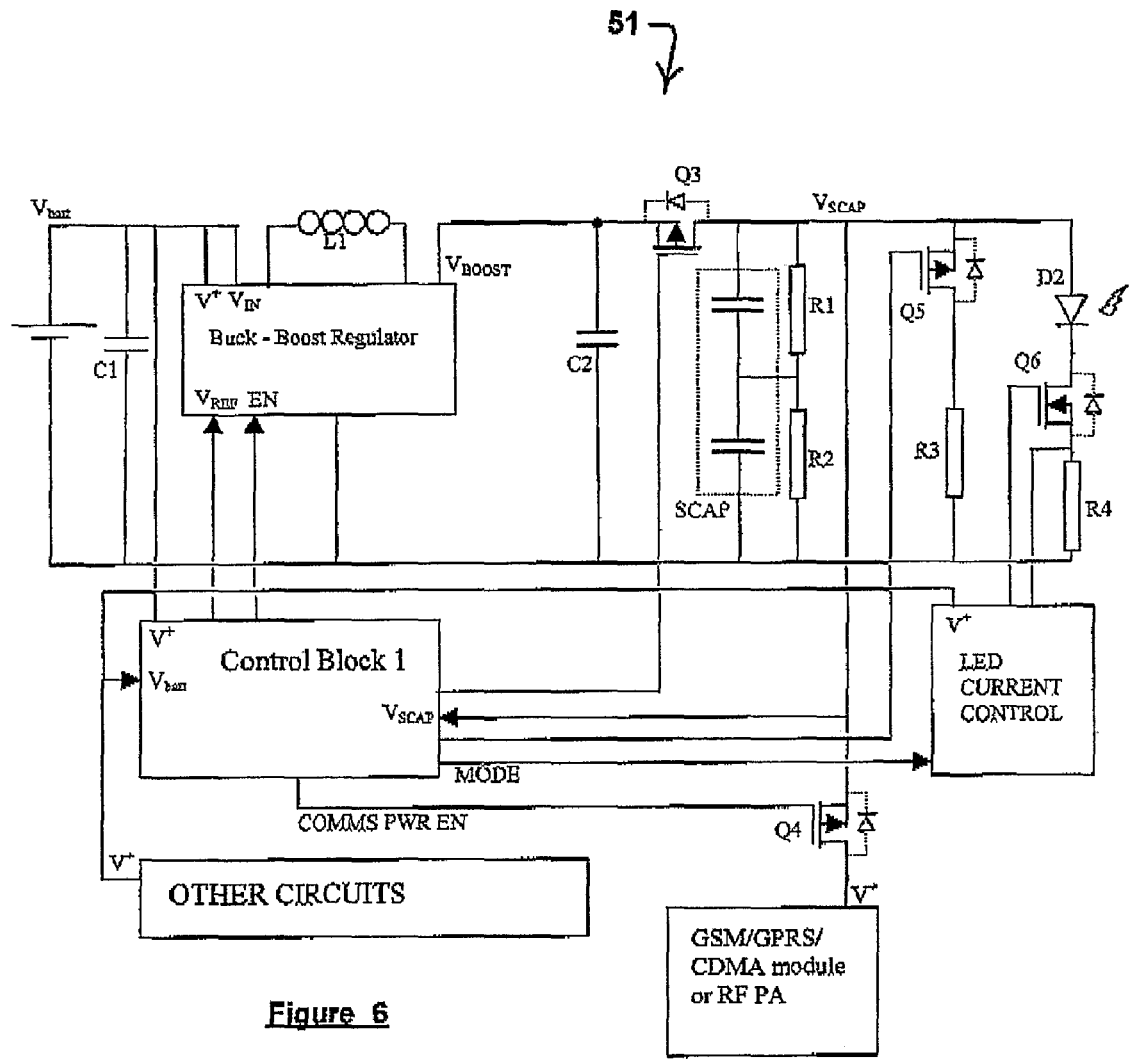
Figure 9:
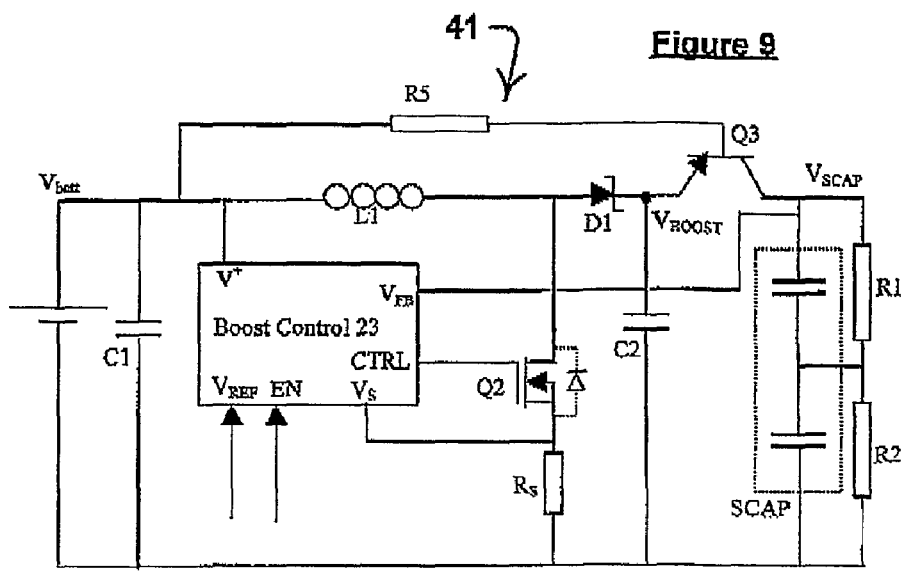
Figure 10:
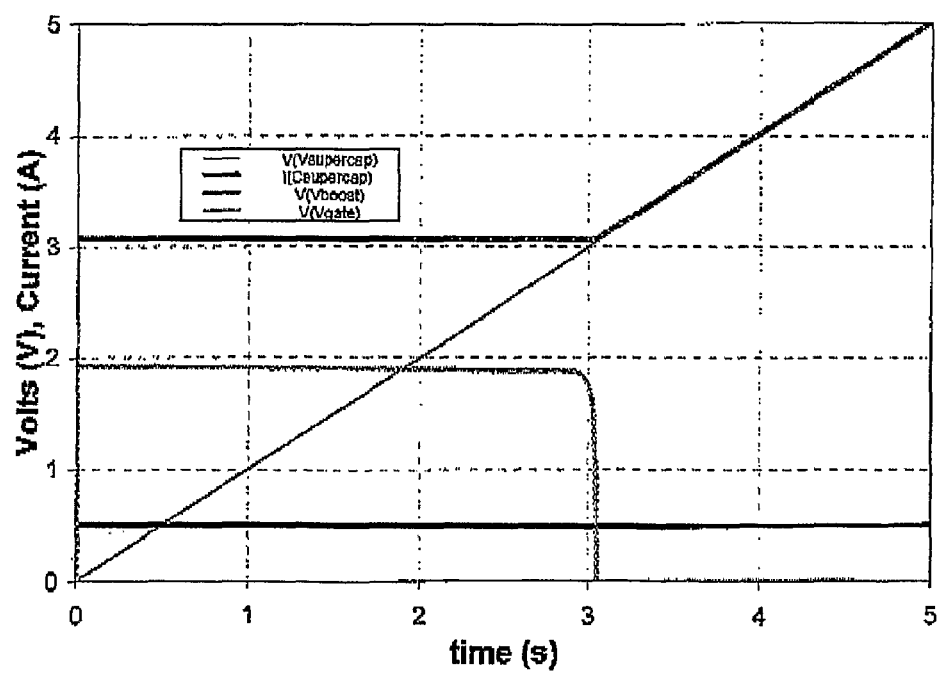

Table 1 illustrates the logic used by the control block to operate the circuit of FIG. 2;

FIG. 6 is a schematic representation of an alternative embodiment of the invention including a buck-boost regulator;

FIG. 7 illustrates a hardware implementation to limit inrush current to the supercapacitor used in an embodiment of the invention;

FIG. 8 shows experimental waveforms of the supercapacitor voltage and battery current as the supercapacitor of FIG. 4 is being charged while preventing inrush current;

FIG. 9 illustrates an alternative hardware implementation to that of FIG. 7;

FIG. 10 sows experimental waveforms for the circuit of FIG. 79

Figure 11:
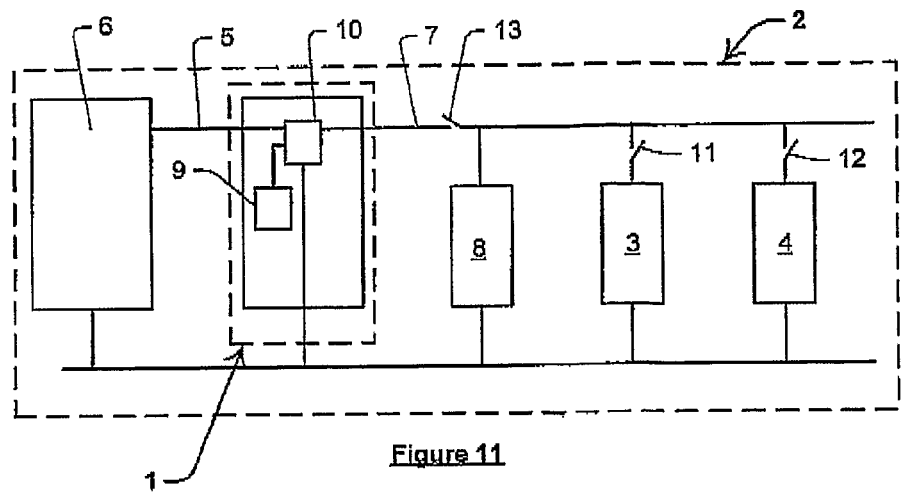

FIG. 11 is a schematic representation similar to that of FIG. 3 of an alternative embodiment of the invention.

Figure 12:
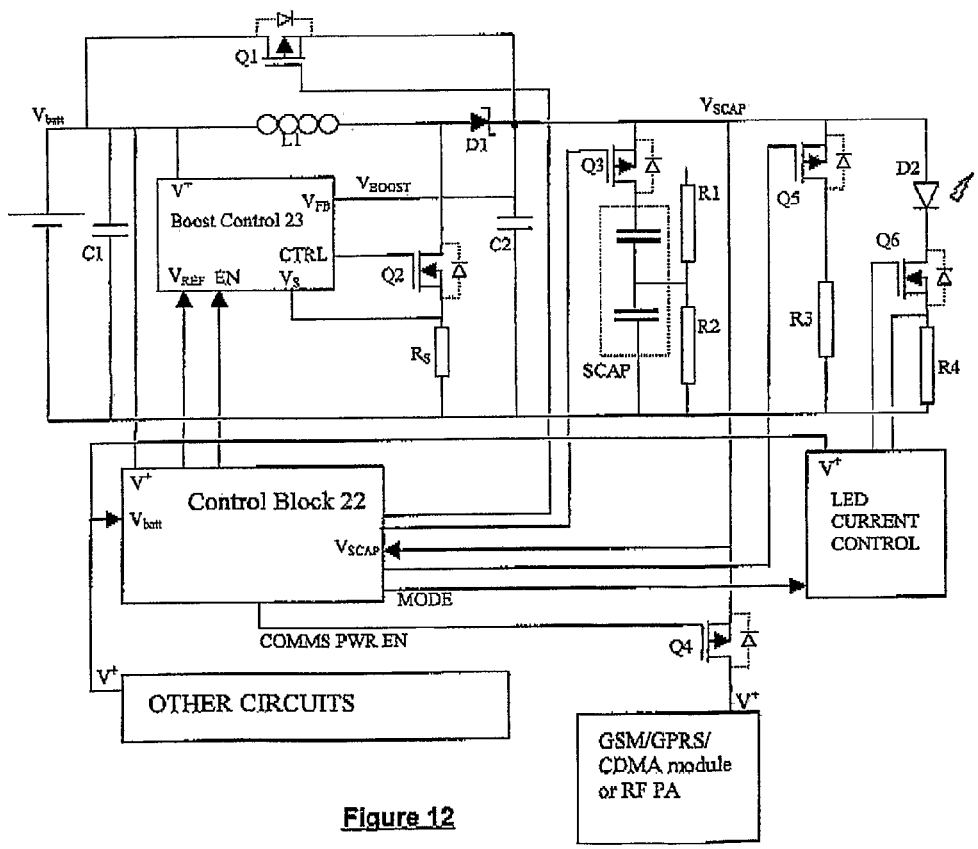
Figure 13:
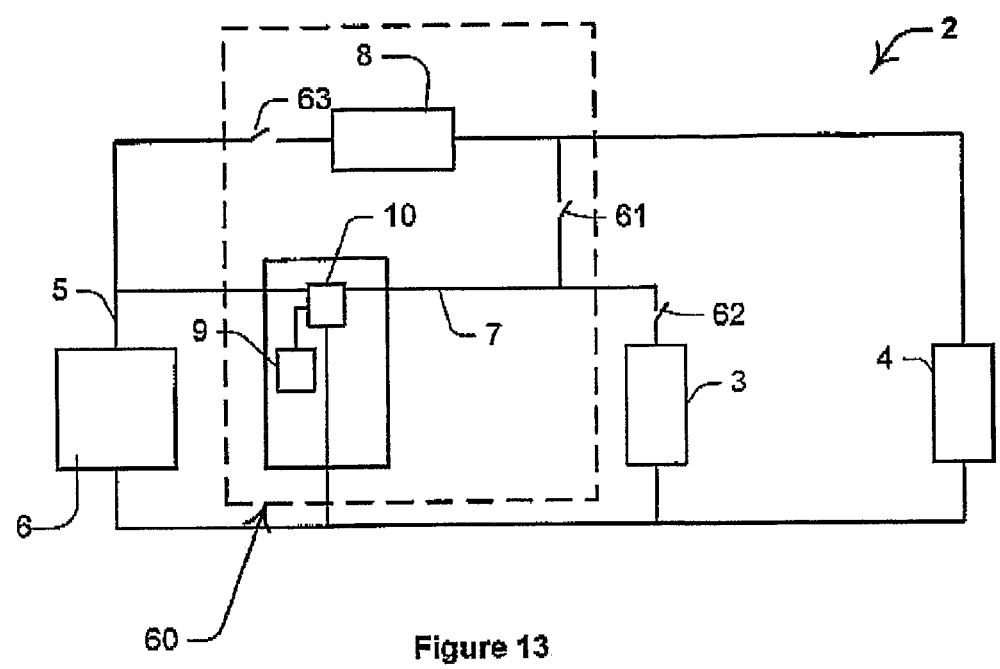
Figure 14:
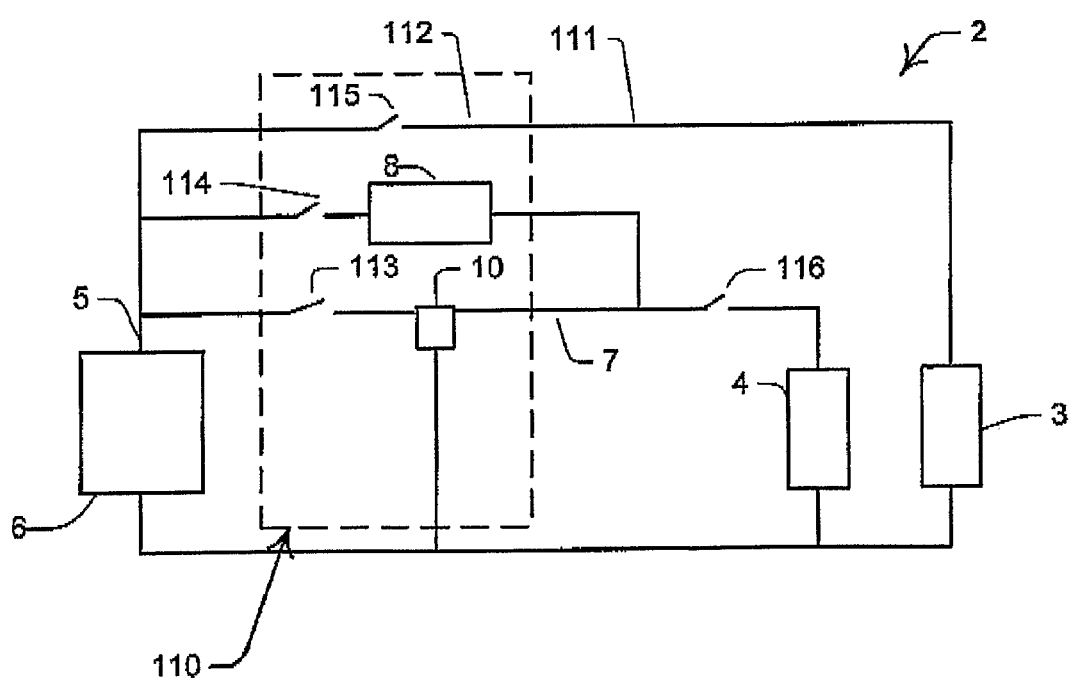
Figure 15:
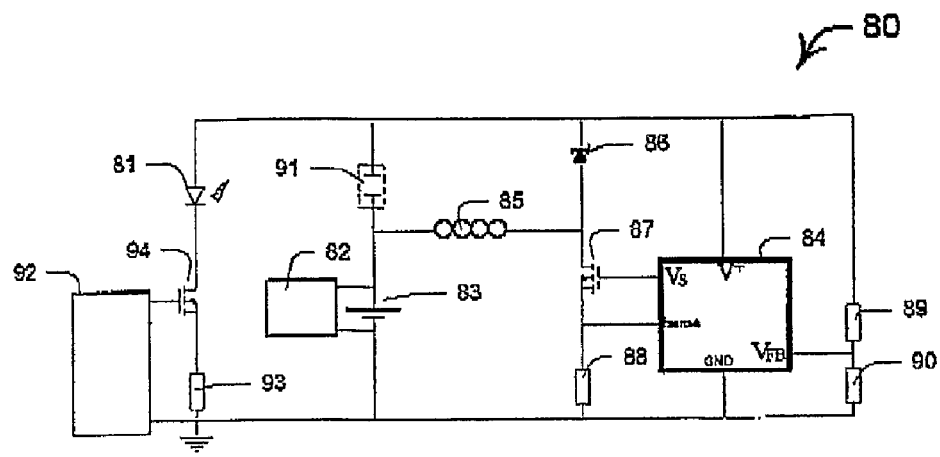
Figure 16:
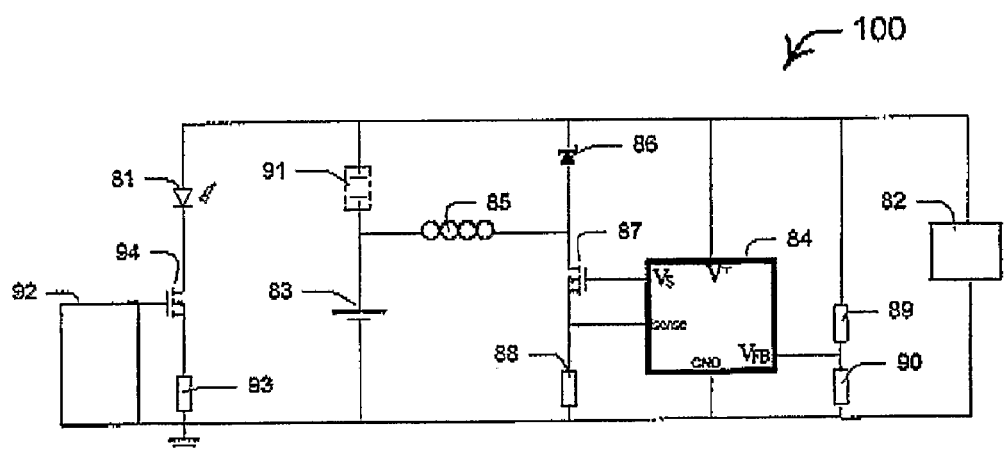
Figure 17:
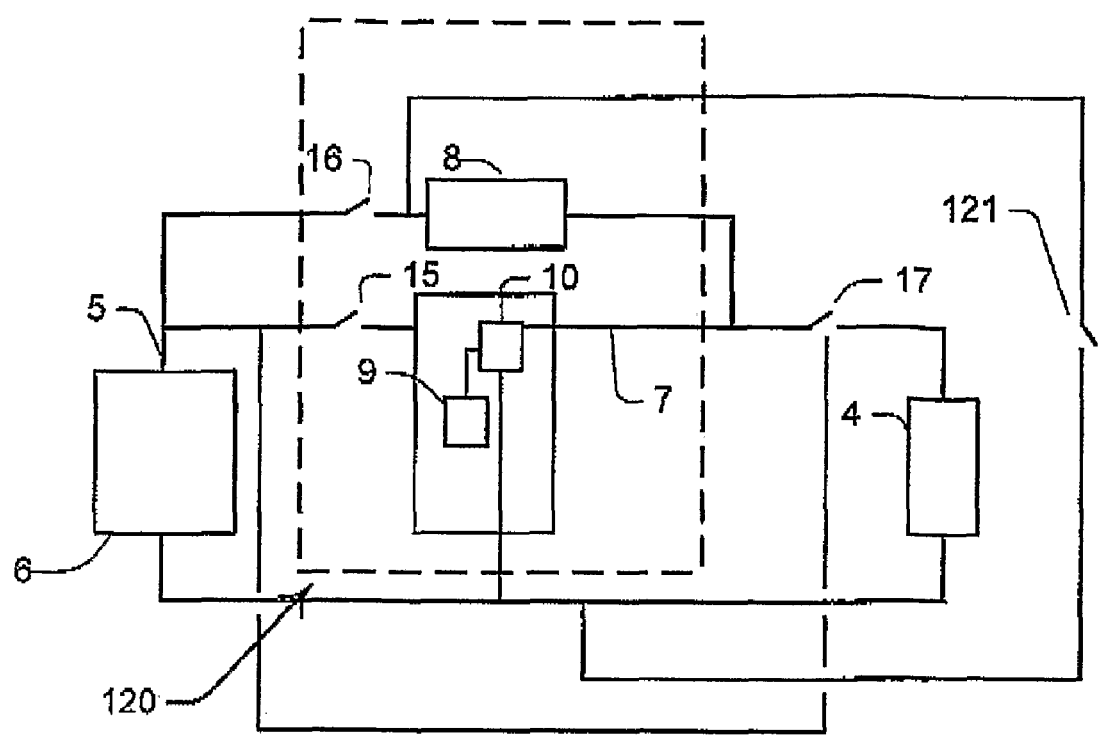
Figure 18:
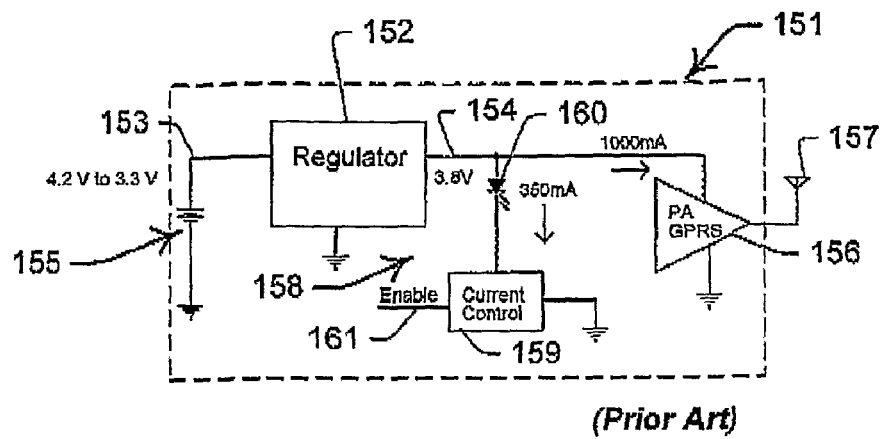
Figure 19:
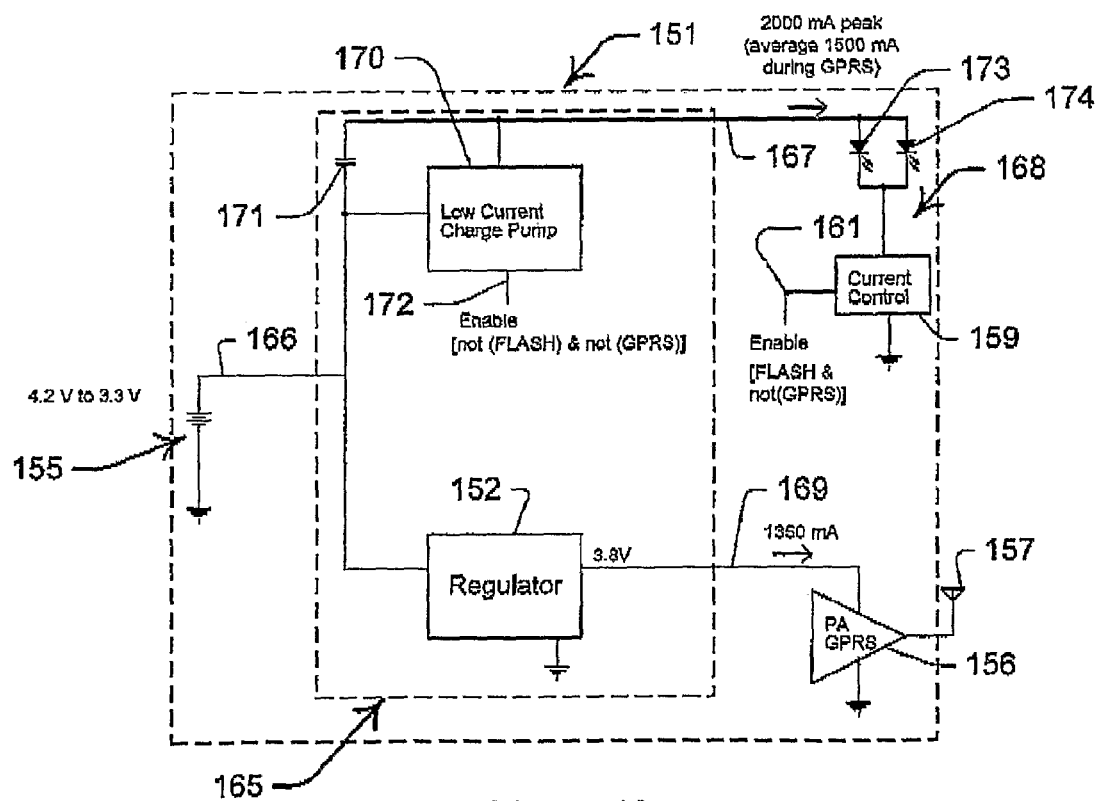
Figure 20:
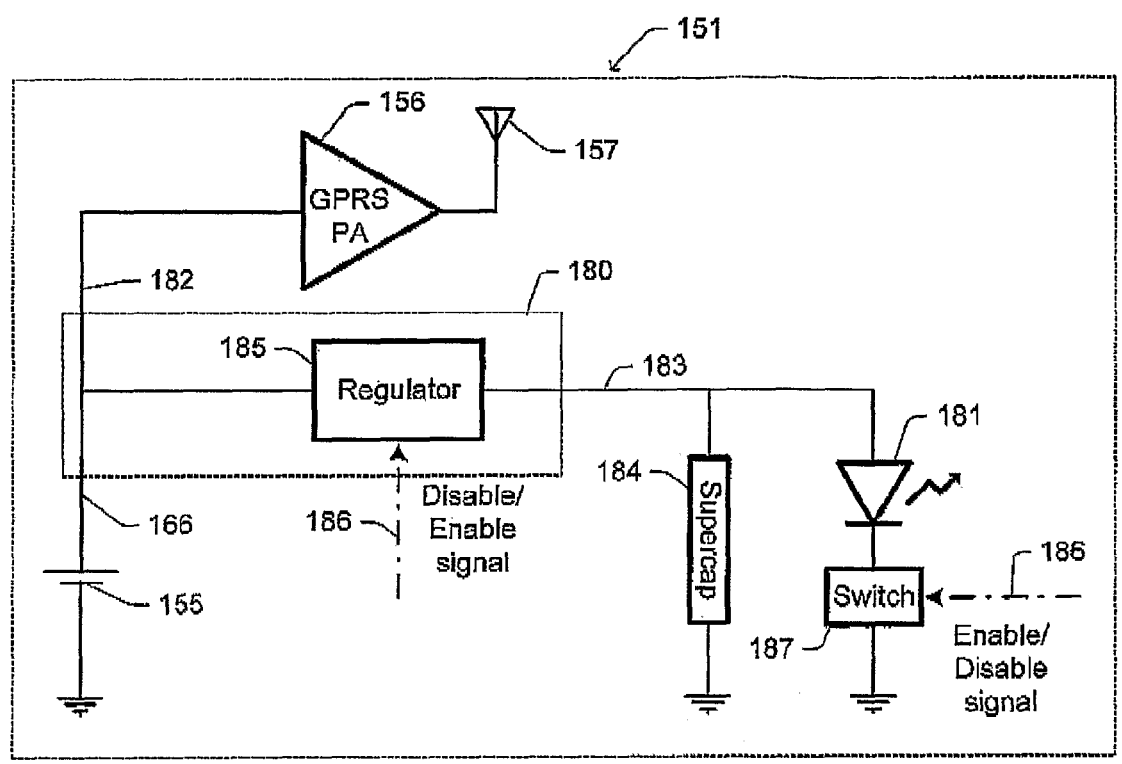

FIG. 12 is a schematic representation of a power supply according to another embodiment of the invention;

FIG. 13 is a schematic representation of a power supply according to another embodiment of the invention;

FIG. 14 is a schematic representation of a power supply according to another embodiment of the invention;

FIG. 15 is a schematic representation of a power supply according to another embodiment of the invention;

FIG. 16 is a schematic representation of a power supply according to another embodiment of the invention;

FIG. 17 is a schematic representation of a power supply according to another embodiment of the invention;

FIG. 18 is a schematic representation of a prior art power supply;

FIG. 19 is a schematic representation of a power supply according to another embodiment of the invention; and FIG. 20 is a schematic representation of a power supply according to another embodiment of the invention.

DESCRIPTION OF THE PREFERRED EMBODIMENTS

Figure 1:
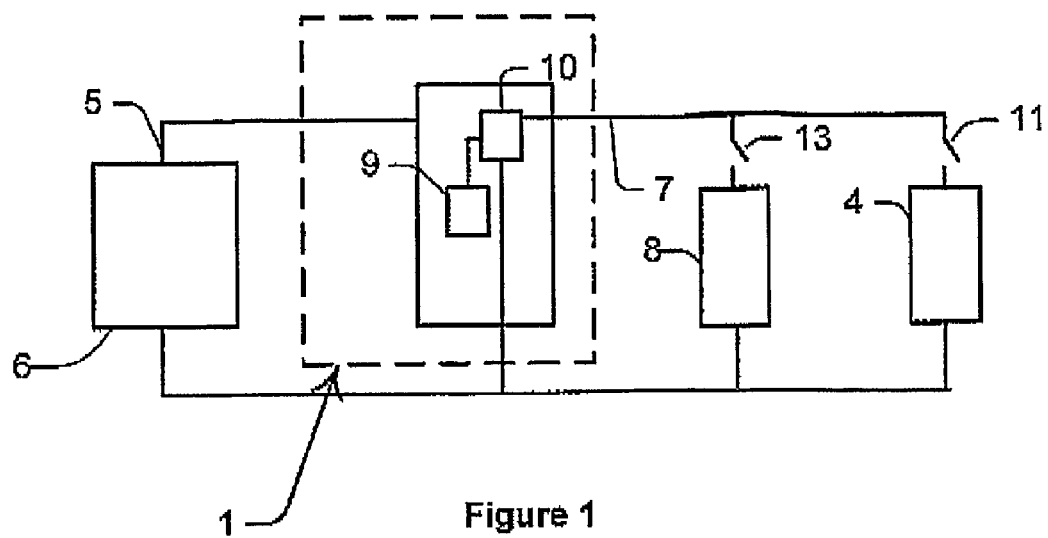
FIG. 1 is schematic representation of a power supply according to an embodiment of the invention.

Referring to FIGS. 1 and 2, there are provided respective power supplies 1 and 20 each for powering a load, the load being in the form of a flash driver circuit 4 for a digital camera (not shown). Each power supply includes a supercapacitive device, in the form of a supercapacitor 8, for powering circuit 4. A regulator unit, in the form of an inductive regulator 10, charges supercapacitor 8.

Each power supply includes an input 5 for connecting to a power source in the form of a lithium ion battery 6. In other embodiments alternate power sources are used, including—but not limited to—alternate battery types.

In the embodiment of FIG. 1, regulator 10 is in series with battery 6, and together these are in parallel with the supercapacitor 8, whereas in the embodiment of FIG. 2, supercapacitor 8 is in series with battery 6.

The regulator unit limits the charging current of the supercapacitor to a predetermined value. In the FIG. 2 embodiment the predetermined value is about 0.5 Amps, while in the FIG. 1 embodiment it is about 0.1 Amps. In other embodiments alternative predetermined values are used.

In the illustrated embodiments, the regulator 10 is a voltage regulator, and more particularity a voltage boost regulator. In some embodiments a buck or buck-boost regulator is used. In another embodiment the regulator unit is in the form of a charge pump.

In some embodiments an optional control block 9 is used to administer functionality, logic and/or selective aspects throughout the circuit. In some embodiments control block 9 is defined by a processor external to the power supply. In other embodiments power supply 1 or 20 is designed for inherent self-administration.

In the embodiment of FIG. 1, switches 11 and 13 progress between the open and closed states to administer the charging/discharging of supercapacitor 8 and the powering of circuit 4. It will be appreciated that when switch 11 is open and switch 13 closed, circuit 4 is isolated from battery 6 and regulator 10 charges supercapacitor 8. When switch 11 is closed, supercapacitor 8 is discharged to power circuit 4. In some embodiments, switch 13 is opened to isolate supercapacitor 8 from battery 6 for reducing current leakage. It will be appreciated, however, that in many embodiments, switch 13 is replaced by a short circuit.

In FIG. 1, and various other Figures within the present specification, selective connections are represented by switches. Despite this, it is appreciated that in some embodiments alternate mechanisms are used for the purpose of selectively powering a load. For example, in some embodiments a load is selectively enabled or disabled as opposed to being physically connected or disconnected. It will be appreciated that this provides the same functionality—although the load is always physically electrically connected, it is only selectively powered. Other mechanisms include the use of switches including one or more FETS, transistors and the like, or enabling/disabling regulator 10. For the purpose of his disclosure, and to allow for convenient visual representation, switches are used to schematically represent any one or more of these or other appropriate mechanisms for enabling selective connectivity.

In the embodiment of FIG. 2, three switches 15, 16 and 17 selectively progress between their respective open and closed states to administer the functionality of power supply 20. In some embodiments not all of these switches are used. In other embodiments, further switches are used.

Switches 15, 16 and 17 allow the power supply to be selectively operable in a charging mode—where the regulator unit charges the supercapacitor 8—and a discharging mode—where the supercapacitor 8 is discharged to power load 4. In the charging mode, switches 15 and 16 are in the closed state, and switch 17 is in the open state. When it is desired to power circuit 4, switch 17 is progressed to the closed state, allowing the discharge of supercapacitor 8 to power circuit 4. In the present embodiment, regulator 10 is isolated from supercapacitor 8 in the discharging mode, and as such switch 15 is progressed to the open state whenever switch 17 is progressed to the closed state. In some embodiments, switch 15 remains in the closed state when switch 17 progresses to the closed state. It will be appreciated that, in such embodiments, regulator 10 provides some load current while supercapacitor 8 discharges. This allows for the use of a smaller supercapacitor, but there is a trade-off through increased stress on—or current drawn from—battery 6.

The embodiments of FIGS. 1 and 2 illustrate two major options for implementing the embodiments of the invention:
  Placing supercapacitor 8 in parallel with circuit 4.
  Placing supercapacitor 8 in parallel with circuit 4 and in series with battery 6.

Each of these options has respective unique benefits. The advantages of each of the major options are dealt with through the description of further embodiments throughout the specification.

FIG. 17 illustrates a schematic representation of a power supply 120 capable of utilising both of the above options. FIG. 17 is set out in a similar fashion to FIG. 2, however switch 17 now progresses between three states, and a further switch 121 is included. Those skilled in the art will recognise that the layout of power supply 120 allows for the polarity of supercapacitor 8 to be appropriately configured in both the series and parallel options referred to above.

Referring to FIG. 3 there is provided an alternate embodiment of power supply 1, also utilising the option where regulator 10 is in series with battery 6, and together these are in parallel with the supercapacitor 8. In this embodiment, power supply 1 is for a cellular telephone 2 having a plurality of internal electrical pulsed loads—in the form of a wireless transmitter 3 for the telephone, and a flash driver circuit 4 for a digital camera (not shown) that is integrated with the telephone—that draw respective load currents. Power supply 1 includes an input 5 for connecting to a power source of telephone 2, which takes the form of a detachable and rechargeable multi-cell lithium ion battery pack 6. In this embodiment, battery pack 6 provides a predetermined maximum source current at a source voltage within a predetermined range. An output 7 selectively connects with titter 3 and driver circuit 4 and provides an output voltage. A supercapacitive device, in the form of a 500 mF supercapacitor 8, is in parallel with output 7. In other cases supercapacitive devices with other values are used A control circuit, in the form of a control block 9 and a regulator 10, is disposed between input 5 and output 7 for controlling the output voltage such that the load currents are provided while maintaining the source current at less than a predetermined value.

The connection of each of the loads to output 7 is selective to allow the loads to be selectively powered. In the FIG. 3 embodiment transmitter 3 and driver circuit 4 are selectively connected to output 7 by way of respective state switches 11 and 12 that are progressed between the open and closed states by control block 9. In this embodiment control block 9 is part of the micro-controller firmware included within telephone 2, and ensures that the loads are mutually exclusively connected to output 7. That is, when one of transmitter 3 and driver circuit 4 is connected to output 7, the other is not. This occurs:
  To limit the peak current having to be provided to the total load and, hence, the peak current having to be delivered by battery pack 6.
  Because regulator 10, at any given time, provides one of a plurality of voltages at the output. In this embodiment; regulator 10 provides either 3.6 Volts or 5.5 Volts at the output when transmitter 3 and circuit 4 are connected respectively. Exposure of transmitter 3 to 5.5 Volts will be detrimental, if not catastrophic and, as such, it is isolated from output 7 by progressing switch 11 to the open state in those instances where the voltage at the output is raised to the higher voltage.

In practical terms there is no disadvantage to the user in not being able to use the two functionalities at the same time. It is also useful to note that circuit 4 only requires greater than 5 Volts when a high intensity light is required for flash photography. If lower intensity light is adequate, then circuit 4 draws a lower current at a lower voltage. For example, in a "flashlight mode", circuit 4 typically draws about 200 mA at 3.6 Volts. In that mode, circuit 4 is able to operate in conjunction with transmitter 3 provided the total average current drawn is less than the predetermined maximum current.

It will be appreciated that in other embodiments additional loads are selectively connected with the output simultaneously or mutually exclusively with transmitter 3 and circuit 4.

Supercapacitor 8 is selectively connected with output 7 by a state switch 13. This switch is operated by control block 9 primarily to isolate supercapacitor 8 from output 7 when the currents demanded by the loads are low. This contributes to an increase in the operational life of battery pack 6, in that the duration between recharges is increased. This arises from a reduction in the losses due to a reduced need for the battery pack to supply the leakage current of supercapacitor 8.

If the currents demanded by the load will not remain low for a long enough period, then switch 13 is eliminated and the supercapacitor remains always connected in parallel to the load. Alternatively, if the loads supported by the supercapacitor will not be used regularly, and long periods of inactivity are common, then the arrangement in FIG. 11 is used. Particularly, switch 13 is located to simultaneously disconnect supercapacitor 8, transmitter 3 and circuit 4 from regulator 10. It will be appreciated that in FIG. 11 corresponding features to FIG. 3 are denoted by corresponding reference numerals.

It will be appreciated that with cellular telephones and other portable digital devices, that one or more of the loads are pulsed loads that toggle between a standby mode and an operable mode where the load current is respectively relatively low and relatively high. For example, transmitter 3 comprises such a load, as it progresses between a transmission mode where power consumption is relatively high, and a standby mode where power consumption is relatively low. Moreover, the pulse load represented by transmitter 3—being a GRPS Class 12 transmitter—has a duty cycle of about 50%. The other specific load under discussion in this embodiment, driver circuit 4, when in use has a duty cycle of about 2 to 10% (typically about 4-5%). It will be appreciated by those skilled in the art that in other embodiments alternative load have different duty cycles.

The power supply of FIG. 3 allows both battery pack 6 and regulator 10 to be designed for relatively low peak currents. This occurs because:

The loads typically have relatively low duty cycles.

The operation of switches 11 and 12 by control block 9 allows, for any given time interval, at least one of the load currents to be zero or close to zero.

The operation of switch 13 by control block 9 allows, for any given time interval, the losses to the battery pack in supplying the leakage current to the supercapacitor to be minimised.

When one of transmitter 3 and circuit 4 draw respective load currents from output 7 and supercapacitor 8 is connected with the output, the supercapacitor contributes to the load currents. Hence, there is a reduction in the peak load current required from the output of the control circuit. In particular, there is a reduction in the peak current required from regulator 10, and the peak current required from battery pack 6.

Supercapacitor 8 has sufficient capacitance to supply the total of the load currents for one cycle of the pulsed load while receiving the maximum allowed current from regulator 10. As transmitter 3 and circuit 4 are not connected simultaneously with output 7, this allows regulator 10 to be designed to supply a peak current which is closer to the average of the current required by the transmitter when in the relatively high power mode. In embodiments such as this, for a given time interval, only a single load current will have a non-zero value. La this instance, the capacity of the supercapacitor need only be sufficient to supply a single cycle of the load demanding the most energy during such a cycle. In some embodiments, however, more than one load is simultaneously connected to the output and, as such, battery pack 6 and regulator 10 have to be configured to provide the required peak currents inherent in such combinations of loads. In this case the current supplied by battery pack 6 and regulator 10 will be the average current over one cycle of the combined loads, while supercapacitor 8 will provide the combined loads with the difference between the current supplied by battery pack 6 and regulator 10 and the peak current required by the combination of loads.

Switches 11, 12 and 13 are responsive to control block 9 for progressing between the open and closed configurations. Preferably, the switches are respective transistors, and more preferably respective FETs.

Control block 9 is responsive to a plurality of variables for determining the state of switches 11, 12 and 13. For example, in this embodiment, control block 9 is responsive to the load current being below a predetermined threshold for determining whether or not to have supercapacitor 8 connected with the output. In other embodiments, however, the supercapacitive device is selectively electrically disconnected from the output when the load current has fallen below the threshold for a predetermined period. In other embodiments, the supercapacitive device is selectively electrically disconnected from the output when the load current has fallen below the threshold and the output voltage is less than the source voltage. In other embodiments, control block 9 sets the state of switches 11, 12, 13 depending on the functions the user has selected, e.g. taking pictures with a camera phone.

Some key principles of the above embodiment are able to be expressed as follows.

Firstly, the loads include respective operating voltages, and at least one of those operating voltages differs from all the other operating voltages. More particularly, the loads draw respective load currents $I_1, I_2, \ldots I_N$ at operating voltages $V_1, V_2, \ldots V_N$, where $N \geq 2$ and $V_1 \neq V_2$, and $\ldots$, and $V_1 \neq V_N$. The control circuit controls the output voltage to selectively provide $V_1, V_2, \ldots V_N$ at the output. More specifically, control block 9 controls regulator to, together with switches 11, 12 and 13, to selectively provide $V_1, V_2, \ldots V_N$ at the output.

It will be appreciated that these different load voltages provided at the output, are so provided while a single supercapacitor is typically maintained in parallel with the output.

Second, at least one of $V_1, V_2, \ldots V_N$ is greater than the predetermined source voltage. That is, the control circuit includes a regulator 10 that is operable to selectively maintain the output voltage at or about the at least one of $V_1, V_2, \ldots V_N$ that is greater than the source voltage provided by battery pack 6. In other embodiments, the regulator is selectively disabled to allow the voltage provided by battery pack 6 to be applied directly through the load. This provides for increased efficiency—as the regulator is not required—for those times where conditions allow for such a connection.

In some embodiments of the invention regulator 10 is a boost circuit to provide an output voltage that is greater than the voltage provided by battery pack 6. In other embodiments regulator 10 is a buck-boost circuit to provide an output voltage at is greater than, less than, or about equal to the voltage provided by battery pack 6.

The voltage and current provided by battery pack 6 vary with time. For example, due to the discharge characteristics of the battery or batteries within the battery pack, the internal resistance of the battery or batteries, and any associated electronic protection circuitry used in the battery pack. Ultimately, the battery pack will be spent and telephone 2 will no longer operate. However, due to the much smaller divergence in peak currents drawn by the different loads supplied by battery pack 6—due to the use of supercapacitor 8 in parallel with the loads—it is possible to gain more runtime from the battery pack than would otherwise be the case.

In other embodiments, the power source is a fuel cell or other portable store of energy. In further embodiments, the power source is a mains power source. More preferably, the power source is a regulated power source. In all cases, the use of supercapacitor 8—or other supercapacitive device—in parallel with the load has the effect of reducing:

The peak current experienced by the power source for a given pulsed load.

The spread of peak currents experienced by the power source due to the different loads.

As will be appreciated by those skilled in the art, a large capacitance provides current and power averaging effects. Importantly, the major capacitance within the power supply of FIG. 3—that being the capacitance provided by supercapacitor 8—is disposed downstream of not only The battery pack but also the regulator. Accordingly, the averaging effect that is achieved is in respect of both the current required to be delivered by the battery pack 6 to input 5, and the current required to be delivered by regulator 10 to output 7. This allows one, or a combination of:

A reduction in size of the battery pack and the regulator and, hence, a reduction in the size of telephone 2.

Providing the same functionality with telephone 2, but for a longer period between recharges.

Offering additional functionality in telephone 2.

The value of the capacitance provided by supercapacitor 8 is an order of magnitude greater, or more, than that which is provided by conventional capacitors that take up corresponding volume within the cell phone or other appliance.

It has been appreciated by the inventors that it is counter intuitive to apply a large capacitance to the load side of the regulator—as has been done in the above embodiment—let alone to put effect to that with a supercapacitive device. The reason being that such a low impedance device on the load side of the regulator will create inrush currents that will overload the regulator and/or the battery. However, the inventors have also appreciated that with minimal hardware complexity beyond the required regulator and the switches 11, 12 and 13, it is possible to guard against such currents, while also achieving considerable additional benefits. These benefits will be described further with reference to the following embodiments of the invention.

Referring to FIG. 4 there is illustrated schematically a circuit 21 that is part of a battery-powered cellular telephone with an integrated digital camera (referred to as "a camera phone"). It will be appreciated by those skilled in the art that the same principles are able to be applied to a PDA with cellular telephone and camera function.

The function of circuit 21 is to provide peak power to either an LED—which in this embodiment is used as a flashlight for the camera—or to a GPRS communications module. In other embodiments, the communications module operates in accordance with one or more of the GSM or CDMA standards. Returning the present embodiment, circuit 21 is suitable for use with communication modules such as:

Siemens MC45.

Wavecomm Q2400.

In further embodiments, circuit 21 is configured for an RE Power Amplifier for GSM, GPRS or CDMA communications, such as:

Motorola MRFIC0970.

Motorola MRFIC1870.

Hitachi PF0812B.

The battery and the regulator—which is in the form of a "boost control"—cannot provide simultaneously the peak power required to operate both the communications module and the LED. For convenience, $V^+$ is used to denote the power input to the various circuit blocks in FIG. 4. It will be appreciated, however, that these inputs to the various circuit blocks will not in all instance be equal. Particularly, some of the circuit blocks—being those with low peak currents—have $V^+$ continuously connected directly to the positive terminal of the battery—that is, to the input of the regulator. However, other circuit blocks, such as the communications module, $V^+$ is connected selectively to the output of the regulator. This voltage, being also the voltage that is across the two cell supercapacitor SCAP, is referred to as $V_{SCAP}$.

Camera phones, PDAs and like portable electronic devices, have a micro controller that implements much of their functionality. In this embodiment, control block 22 is implemented as part of the micro controller firmware. However, in embodiments where that micro controller has less than two A/D inputs and insufficient digital I/O, this functionality is able to be implemented as a combination of micro controller firmware with external interfacing hardware. In still further embodiments, the functionality is provided through implementation in hardware in addition to any micro controller.

The key features of circuit 21 are set out below. These features should be read in the context of the information in Table 1.

Circuit 21 includes a voltage regulator in the form of a boost converter that is based around a standard chip designated as boost control 23. The boost converter sets the voltage to that required to drive, at any one time, either.

An LED D2 when the flash function is required (denoted in Table 1 as $V_{FLASH}$ in FLASH mode); or The communications module 24 when communications is required (denoted in Table 1 as $V_{COMMS}$ in COMMS mode).

In some embodiments the LED D2 is defined by multiple LEDs in parallel. In further embodiments LED D2 is defined by multiple LEDs in series however it will be appreciated that is will require a multi-cell supercapacitive device.

The voltage generated by the boost converter is marked in FIG. 4 as $V_{BOOST}$, and it is tins voltage, less any voltage drop that appears across a FET Q3, that will be applied to any load. It will be appreciated that for the loads of interest—LED D2 and communications module 24—the values of the required load voltages—being $V_{FLASH}$ and $V_{COMMS}$ respectively—is different. In this embodiment, the value of $V_{FLASH}$ and $V_{COMMS}$ are about 5.5 Volts and 3.6 Volts respectively. In other embodiments, additional loads are included which require $V_{BOOST}$ to be selectively set at a voltage or voltages that are different from $V_{FLASH}$ and $V_{COMMS}$.

The boost controller selects $V_{BOOST}$ to be either $V_{FLASH}$ or $V_{COMMS}$, depending upon the load that is present. The value of this voltage is controlled by setting the reference voltage input $V_{REF}$ of the boost converter. While in this embodiment that voltage is controlled directly from the control block 22, in other embodiments alternative arrangements are used. One alternative is to connect the relevant input to a voltage reference provided by a resistive divider, and to use a FET to switch a further resistor in and out of circuit, as required. An example of this is shown schematically in FIG. 5. It will be appreciated that other arrangements are possible, including the use of a D/A converter, or other components.

The boost converter in FIG. 4 has a PET Q2 that is external to boost control 23, and is included in combination with diode D1 for switching. As will be appreciated by those skilled in the art the switching occurs to cause inductor L1, in combination with the other components, to generate a value for $V_{BOOST}$ that is greater than $V_{batt}$. Other alternatives to the combination of FET Q2 and diode D1 include:

A synchronous boost converter with D1 replaced by a PFET.

A boost converter IC that includes similar components internally to the IC.

With the benefit of the teaching herein, other combinations would be apparent to the skilled addressee.

If the battery voltage $V_{batt}$ is less than the $V_{BOOST}$ for a given load, then control block 22 will enable the boost converter by holding pin EN of boost control 23 high Contemporaneously, control block 22 drives the gate of FET Q1 high so that FET Q1 is OFF. Conversely, if the battery voltage $V_{batt}$ is greater than or equal to the required $V_{BOOST}$, then the boost converter is disabled and Q1 is turned ON.

This combination of events increases the efficiency of circuit 21 when the battery is at a high state of charge, but also allows circuit 21 to continue operating when the battery is at a low state of charge. Moreover, as the use of a supercapacitor on the load side of the regulator reduces the peak current load on the battery, this will also contribute to an increased ability to draw more energy from the battery. Particularly, the peak drop in $V_{batt}$ due to the internal resistance of the battery is reduced.

In some embodiments it is possible to run circuit 21 and the associated cellular telephone until $V_{batt}$ is about 1.5 Volts. In the instance of a lithium ion battery it will not be drained to this level to prevent damaging the battery. However, it will be drained typically to about 3 Volts, at which point there is very little energy left in the battery. It also has the benefit of allowing circuit 21 to be powered by alternative batteries, such as two AA cells in series, or three AA cells in series. This functionality allows a user of the telephone to seek a cost effective short-term power supply in the event that the normal battery is discharged and not able to be recharged prior to a desire use. This has particular advantage in emergency situations.

Battery packs for portable electronic devices typically include one or more rechargeable batteries, and protection circuitry for reducing the risk of damage to those batteries during charging, recharging and use. The protection circuitry is responsive to $V_{batt}$ filling to a "shutdown voltage" for preventing any further discharge of the batteries. This is important, for some batteries, as discharging to too low a level increases the risk of damage to the batteries. For a primary battery, however, circuit 21 will operate until the battery voltage is below the minimum input voltage for the boost converter, typically approximately 1.5 Volts.

Circuit 21 includes a single supercapacitive device in the form of a two-cell supercapacitor SCAP. This supercapacitor is produced by CAP-XX and designated as GS206 It will be appreciated that in other embodiments alternative supercapacitors are used.

Supercapacitor SCAP provide pulse current to either: LED D2 when a flash is required; or to the communications module 24 when communications is required.

The supercapacitor SCAP is charged through the boost control 23 and FET Q3. This combination allows the current provided by the regulator to be controlled, and hence to limit any inrush current to supercapacitor SCAP when it is in a low state of charge. It will be appreciated that the current limit function in boost control 22 only works once the output voltage of the regulator is greater than the input voltage to the regulator ($V_{batt}$) less the voltage drop across diode D1. As the voltage drop across the diode D1 is typically about 0.5 Volts, the regulator is only effective in limiting current when:

$V_{BOOST} > V_{batt} - 0.5$ Volts

Until this condition is met, diode D1 conducts, and current flows to the load through inductor L1 and diode D1.

If supercapacitor SCAP needs to be charged, control block 23 turns FET Q3 OFF until $V_{BOOST} > V_{batt}$ and then turns FET Q3 ON. Once in this state, supercapacitor SCAP is progressively charged to the level of $V_{BOOST}$.

An alternative to PET Q3 and the associated control logic is the use of a PNP transistor as shown in FIG. 9. For ease of reference, the PNP transistor is referred to as transistor Q3. This transistor will not conduct until $V_{BOOST}$ is approx 0.7 Volts greater than $V_{batt}$, at which point there is sufficient base-emitter voltage to turn transistor Q3 ON. FIG. 10 shows the charge current and supercapacitor voltage for this embodiment, with the boost current limit set to approximately 600 mA.

If the value of $V_{BOOST}$ required for the FLASH mode is greater than the maximum voltage allowable at the power input of communications module 24, then an FET Q4 is included to isolate module 24 when circuit 21 is in FLASH mode.

If the value of $V_{BOOST}$ required for the FLASH mode is likely to shorten the operation life of supercapacitor SCAP, then $V_{BOOST}$ is reduced when FLASH mode is not required. For example, in this embodiment, control block 22 contains a timeout period. If the camera phone remains in FLASH mode for the timeout prod since the last user activity took place, then the unit reverts to non-FLASH mode and $V_{BOOST}$ is reduced to the level required for COMMS mode. In this embodiment the timeout period is one minute, while in other embodiments the timeout period is different. Usually, the timeout period is in the range of about thirty seconds to about five minutes. The user activity referred to above includes, by way of example, activities such as focusing the camera, taking a picture, selecting a mode for the camera, or the like.

In the embodiment shown in FIG. 4, FET Q5 and resistor R3 are included to rapidly discharge the supercapacitor from $V_{FLASH}$ to $V_{COMMS}$. In other embodiments, FET Q5 and resistor R3 are omitted and the supercapacitor is discharged through diode D2, FET Q6 and resistor R4.

In another embodiment, the forward voltage required to drive LED D2 is low enough that $V_{FLASH}$ is less than the maximum operating voltage for communications module 24. That being so, circuit 21 includes the following simplifications:

VBOOST is fixed at a single value, in that VBOOST=VFLASH=VCOMMS. This allows the voltage reference to the boost converter (or Buck-Boost converter in other embodiments) to be fixed. That is, there is no longer a need for control block 22 to select the reference voltage to ensure VBOOST is matched to the load that is presently drawing current from boost control 23.

Conditions 7 to 12 in Table 1 are not required.

FET Q4 is not required, as V+ of communications module 24 is able to be directly connected to $V_{SCAP}$.

FET Q5 and its associated control logic are no longer required to discharge supercapacitor SCAP from VFLASH to VCOMMS. Accordingly, in addition to FET Q5, it is also possible to dispense with resistor R3 and the associated control logic in control block 22.

If the maximum operating voltage of control block 22, other circuits 27 used in the camera phone, and LED current control 28 are all less than $V_{FLASH}$ then the respective power supply pins are, in some embodiments, connected directly to $V_{BOOST}$ and not $V_{batt}$ to provide a better regulated source of power. Additionally, this alternative allows circuit 21 to operate even when the battery is at a very low state of charge as boost converter is able to operate to maintain $V_{BOOST}$ at a level greater than $V_{batt}$. Any further circuits within the camera phone are also able to draw power from the output side of the boost controller rather than directly from the battery. Such other circuits include, for example, other voltage regulators, DC-DC converters, or other power supplies.

As mentioned above, supercapacitor SCAP is a multi-cell supercapacitor, where two cells are connected in series. Each cell has a nominal operating voltage of about 2.5 Volts. It is possible to exceed this voltage without permanently damaging the supercapacitor, although prolonged periods of operation at higher voltages can degrade the effective life of the supercapacitor. The supercapacitor does ultimately breakdown once sufficient voltage is applied.

Supercapacitor SCAP draws leakage current when held under voltage. Further, to achieve a balance of voltages between the cells in the supercapacitor, use is made of a balancing circuit 31. The purpose of circuit 31 is to prevent any one cell going over-voltage and damaging the supercapacitor. This embodiment includes one of the simplest forms of balancing circuit which comprises two series connected equal value resistors R1 and R2 in parallel with each cell of supercapacitor SCAP. Resistors R1 and R2 are referred to as balancing resistors.

Balancing circuit 31 also draws current. The combination of the leakage current of supercapacitor SCAP, and the current drawn by circuit 31 is an unwanted drain on the battery when the camera phone is turned off or in standby mode. One option is for control block 22, during such times of low load current requirements, to turn OFF both the boost control 23 and FET Q3. When control block 22 senses that the camera phone is likely to transmit—for example, when the user commences entry of a telephone number that is to be dialed—supercapacitor SCAP is charged progressively to the required voltage through FET Q3. The progressive charging is undertaken to control supercapacitor inrush current. In this embodiment, control block 22 and the other circuits 27 of the camera phone are powered directly from $V_{batt}$ and so are enabled independently of the charge state of supercapacitor SCAP.

In other embodiments, as mentioned above, control block 22, other circuits 27, and LED current control 28 are powered from $V_{BOOST}$. In those embodiments, the reduction of losses from leakage currents from the supercapacitor and the balance resistors is achieved in periods of low load current demand by leaving boost control 23 enabled, and FET Q3 turned OFF.

Alternatively, PET Q3 is left ON if the communications module 28 is periodically required to transmit his occurs, for example, in response to polls from the network this case the battery or other power source must tolerate the energy loss from the balance circuit shown in FIG. 4. A refinement to this is to use a very low current active balance circuit. Typically the current from a low current active circuit, inclusive of the supercapacitor leakage currents would be less than about 5 µA.

In other embodiments FET Q3 is placed as shown in FIG. 12. This disconnects the supercapacitor and the associated balance circuit from the output of the boost control 23, while leaving the communications module 24 powered and able to respond to polls from the network. The responses to the polls are typically only one GPRS timeslot (that is, 577 µS) that, in some embodiments, are supported by a smaller capacitance than that provided by supercapacitor SCAP.

Table 1 provides the logic used in circuit 21. To assist the addressee, the following comments are provided:

$V_{batt}$ is the battery voltage, which may be greater or lesser than the nominal or required load voltage $V_{COMMS}$ for communications module 24.

It is assumed that communications module 24 runs directly from the maximum possible value of $V_{batt}$. When $V_{batt} > V_{COMMS}$ then the communications module is powered directly by the battery and supercapacitor SCAP. That is, FETs Q1, Q3 and Q4 are ON, and the boost control 23 is disabled.

The buck-boost regulator topology shown in FIG. 6 is used in some embodiments of the boost only regulator topology of FIG. 4. This eliminates the need for die bypass FET Q1 and associated logic. Moreover, if there is a current sense in the inductor path, this eliminates the need for FET Q3 and its associated logic. However, in some embodiments, it is desired to disconnect the supercapacitor from the output of the buck-boost regulator (as described above) and, as such, FET Q3 is retained.

The minimum voltage the supercapacitor needs to be charged to in order to supply The pulse power to LED D2 is greater than the minimum voltage the battery will discharge to while still keeping the circuit fully operational. It is for this reason use is made of a regulator in the form of a boost converter or a buck-boost converter.

When a boost converter is used, the implementation of the comparison between $V_{batt}$ and $V_{BOOST}$ for the control of PET Q3 optimally includes compensation for hysteresis effects.

DV is the tolerance from the target voltage to which the supercapacitor must be charged before turning the relevant FET ON. One notation—that is, "DV"—has been used for all cases, but it will be understood that in different instances DV will have the same or different values for each of the conditions listed.

To contain peak currents it is necessary to control the inrush current when charging a discharged supercapacitor. Some methodologies for doing so are disclosed in PCT/AU02/01762, the subject matter of which is incorporated herein by way of cross-reference. A typical implementation of a current limit fraction in a boost converter or regulator will not limit supercapacitor inrush current until the boost voltage provided by the regulator is greater than the input voltage to that regulator. This is because the usual current sense function is often implemented in the ground leg of FET Q2. As is illustrated in FIG. 4, that ground leg is the source of FET Q2.

When the output voltage of the regulator is less than the input voltage of the regulator less the diode drop across diode D1:

FET Q2 will be OFF.
There will be no current sense active.
Current will flow through L1 and D1.

The embodiments of the invention are configured to ensure the inrush currents are prevented, or at least controlled. The two solutions included in this specification are those provided in FIG. 4 and FIG. 6 respectively. Turning firstly to FIG. 4, circuit 21 includes a FET Q3 and a comparator with hysteresis to compare input voltage ($V_{batt}$) with output voltage ($V_{BOOST}$), It will be appreciated that while the input voltage in this embodiment is provided by a secondary battery, in other embodiments it is provided by a different voltage source, not necessarily a battery.

The hysteresis value is set at twice VD1, where VD1 is the voltage drop across D1 when D1 starts to conduct. As will have been ascertained from FIG. 4, diode D1 is a schottky diode, and has a typically voltage drop VD1 of about 500 mV. In other embodiments alternative diodes and hysteresis values are used.

When $V_{BOOST} > (V_{batt} + VD1)$, FET Q3 is turned ON. This discharges capacitor C2 into supercapacitor SCAP. When $V_{BOOST} < (V_{batt} - VD1)$, FET Q3 is turned OFF. This allows boost control 23 to charge capacitor C2 once more. It also prevents excessive inrush current since diode D1 will only just start to conduct when $V_{BOOST} < (V_{batt} - VD1)$. This cycle continues until the charge on supercapacitor SCAP is such that the voltage differential between $V_{batt}$ and $V_{BOOST}$ is sufficiently small to prevent inrush currents.

FIG. 7 illustrates one possible hardware implementation of the inrush current limiting function used in embodiments of the invention. FIG. 8 is a SPICE simulation of the supercapacitor voltage and battery current as the supercapacitor is being charged. In other embodiments the hysteresis value is set at less than VD1, with the result that it takes longer to charge the supercapacitor.

The comparison function is implemented in other embodiments using an A/D converter and a micro controller. The micro controller implements the following algorithm:

When VBOOST>(Vbatt+VD1): turn ON FET Q3.
When VBOOST>(Vbatt−VD1): turn OFF FET Q3.

In some embodiments the A/D converter, and the ability to switch more than one input channel to the A/D, is already available in the micro controller. In such embodiments the complete functionality is therefore implemented in firmware. In alternative embodiments where only one input channel is available into the micro controller A/D, $V_{batt}$ and $V_{BOOST}$ are switched to this input channel using two FETs or analogue switches external to the micro controller. Another alternative is to use an A/D converter external to the micro controller. The micro controller switches $V_{batt}$ or $V_{BOOST}$ to the input of the A/D as appropriate, and reads the results. The gate of PET Q3 is then controlled according to the above algorithm.

The advantages of using the FET Q3 to limit the current are:

For a hardware implementation for inrush current control: VBOOST is able to be set as low as (Vbatt+half the hysteresis voltage used in the comparator).

For a firmware implementation for inrush current control: the hysteresis is able to be simply offset by turning FET Q3 ON when VBOOST>Vbatt, and by turning BET Q3 OFF when VBOOST<(Vbatt−VH), where VH is set to contain the current flowing from the battery below a maximum limit. It has been found that VD1 is a good choice for VH as it allows VBOOST to be set at Vbatt Since FET Q3 is either OFF or ON, and never in its linear region except instantaneously while switching, there is little power loss in PET Q3. This allows FET Q3 to be a small device.

A second solution for limiting or preventing inrush currents to the supercapacitor is illustrated in FIG. 9. In this specific implementation circuit 41 includes a transistor Q3, which is a BJT having the model designation ZXT13P12DE6. In other embodiments different transistors are used. Transistor Q3 is chosen to:

Manage the power dissipation to which it will be subject while charging the supercapacitor SCAP.

Have a low saturation voltage, which in turn reduces power dissipation.

In circuit 41, the voltage feedback input ($V_{FB}$) to the boost control 23 is connected to the supercapacitor voltage ($V_{SCAP}$). When boost control 23 is enabled, capacitor C2 is charged. However, with the feedback input being connected to $V_{SCAP}$, $V_{FB}$ remains at 0 Volts (assuming the supercapacitor is fully discharged). When the voltage at capacitor C2 ($V_{BOOST}$) is greater than the sum of $V_{batt}$ and the base-emitter turn on voltage of transistor Q3, then that transistor turns ON to allow partial charging of the supercapacitor. During this charging, the normal function of boost control 23 to hit current-operates. A resistor R5 is selected to allow transistor Q3 to achieve saturation, without the current through resistor R5 being excessive. Typical values for resistor R5 are in the range of about 27 Ohms to 100 Ohms.

One of the major advantages of circuit 41 is that it requires no specific logic control. Importantly, however, the circuit is best suitable to those applications where, at all times, $V_{BOOST}$ to be greater than $(V_{batt} + V_{BE})$, where $V_{BE}$ is the turn on voltage of transistor Q3. Typically, $V_{BE}$ is about 0.6 Volts. If $V_{BOOST} > (V_{batt} + 0.6 \text{ Volts})$ it is beneficial to place another Schottky diode, similar to D1, between the collector of transistor Q3 and the supercapacitor to prevent current flowing through the p-n junction formed by the collector and base of transistor Q3.

FIG. 10 shows experimental waveforms for circuit 41 when the supercapacitor being charged is a CAP-XX GW201 supercapacitor. The characteristics of this supercapacitor being: a capacitance of 300 mF; and an ESR of 80 mOhms. The supercapacitor is disposed on the output side of the regulator, and charged to 3.8 Volts from a battery having a $V_{batt}$ of 3 Volts and a battery current limit of 500 mAmps.

Some of the above embodiments use a current limiting functionality in combination with hysteresis for the comparison function that controls the FET Q3. With that combination in place, some consideration is to be given to the selection of $V_{BOOST}$ and minimum battery voltage for powering the communications module 24 directly from the battery.

Take the case where the SET Q3 is controlled by the follow logic:

Turn ON FET Q3 when $V_{BOOST} > V_{batt} + V_H$

Turn OFF FET Q3 when $V_{BOOST} < V_{batt} - V_L$ where $V_H$ and $V_L$ are the high and low hysteresis voltages respectively. If $V_{COMMS}$ is the output voltage from boost control 23 when the communications module 24 is powered by boost control 23 rather than the battery directly, it is optimum to control the boost control 23 and FET Q1 by the following logic:

Disable the boost control 23 and turn ON PET Q1 when:

$V_{batt} > V_{COMMS} - V_L$

Enable the boost control 23 and turn OFF Q1 when:

$V_{batt} < V_{COMMS} - V_L$

To implement this, the conditions in control block 22 are altered accordingly.

TABLE 1

CONTROL BLOCK 22 FUNCTIONALITY

| State ID | MODE | $V_{SCAP}$ | Vbatt cf. $V_{BOOST}$ | $V_{batt}$ cf required boost voltage | Boost EN | $V_{REF}$ set for $V_{BOOST}=$ | Q1 | Q3 | Q4 | Q5 | Action |
|---|---|---|---|---|---|---|---|---|---|---|---|
| 1 | CHRG SCAP COMMS | $<V_{batt} - \Delta V$ | $V_{BOOST} < V_{batt}$ | $V_{batt} > V_{COMMS}$ | ON | $V_{FLASH}$ | OFF | OFF | OFF | OFF | If the unit is in COMMS mode, and $V_{batt} > V_{COMMS}$ you need to temporarily change the boost voltage to $V_{FLASH}$ to ensure the boost so the current limit becomes operational. |
| 2 | CHRG SCAP COMMS | $<V_{batt} - \Delta V$ | $V_{BOOST} > V_{batt}$ | $V_{batt} > V_{COMMS}$ | ON | $V_{FLASH}$ | OFF | ON | OFF | OFF | When $V_{BOOST} > V_{batt}$ the current limit is operational and you can turn on Q3 to charge the supercap. |
| 3 | COMMS | $=V_{batt} \pm \Delta V$ | X | $V_{batt} > V_{COMMS}$ | OFF | $V_{FLASH}$ | ON | ON | ON | OFF | $V_{SCAP}$ is within tolerance of $V_{batt}$ which is being used to power the COMMS module so you can now connect the battery to the supercap without excessive inrush current and enable power to the COMMS module. You are ready to communicate. |
| 4 | CHRG SCAP COMMS | $<V_{COMMS} - \Delta V$ | $V_{BOOST} < V_{batt}$ | $V_{batt} < V_{COMMS}$ | ON | $V_{COMMS}$ | OFF | OFF | OFF | OFF | If the unit is in COMMS mode, and $V_{batt} < V_{COMMS}$ but the supercap is discharged, then set $V_{BOOST} = V_{COMMS}$ with Q1, Q3 OFF to prevent battery discharging into the supercap. |
| 5 | CHRG SCAP COMMS | $<V_{COMMS} - \Delta V$ | $V_{BOOST} > V_{batt}$ | $V_{batt} < V_{COMMS}$ | ON | $V_{COMMS}$ | OFF | ON | OFF | OFF | When $V_{BOOST} > V_{batt}$ the current limit is operational and you can turn on Q3 to charge the supercap. |
| 6 | COMMS | $<V_{COMMS} \pm \Delta V$ | $V_{BOOST} > V_{batt}$ | $V_{batt} < V_{COMMS}$ | ON | $V_{COMMS}$ | OFF | ON | ON | OFF | $V_{SCAP}$ is within tolerance of $V_{COMMS}$ so you can now enable power to the COMMS module and you are ready to communicate. |
| 7 | CHRG SCAP FLASH | $<V_{FLASH} - \Delta V$ | $V_{BOOST} < V_{batt}$ | $V_{batt} < V_{FLASH}$ | ON | $V_{FLASH}$ | OFF | OFF | OFF | OFF | Charge the boost so that $V_{BOOST} > V_{batt}$ so the current limit becomes operational |
| 8 | CHRG SCAP FLASH | $<V_{FLASH} - \Delta V$ | $V_{BOOST} > V_{batt}$ | $V_{batt} < V_{FLASH}$ | ON | $V_{FLASH}$ | OFF | ON | OFF | OFF | When $V_{BOOST} > V_{batt}$ the current limit is operational and you can turn on Q3 to charge the supercap. |
| 9 | FLASH | $>V_{FLASH} - \Delta V$ | $V_{BOOST} > V_{batt}$ | $V_{batt} < V_{FLASH}$ | ON | $V_{FLASH}$ | OFF | ON | OFF | OFF | The supercapacitor has been charged to within tolerance of $V_{FLASH}$. You are now ready to use the flash. |
| 10 | DSCHRG SCAP TO COMMS | $>V_{batt} - \Delta V$ | X | $V_{batt} > V_{COMMS}$ | OFF | X | OFF | OFF | OFF | ON | Supercap has been charged to a value > Vbatt using Boost current limit, however, Vbatt is sufficient voltage for COMMS mode. Now turn off boost and discharge supercap through R3 until supercap voltage is close enough to battery voltage you can connect battery to supercap in Condition 11. |
| 11 | COMMS | $=V_{batt} \pm \Delta V$ | X | $V_{batt} > V_{COMMS}$ | OFF | X | ON | ON | ON | OFF | Supercap has been discharged to approximately the same value as the battery, can connect battery to supercap without too high an inrush current and enable power to COMMS module. You are ready to communicate. |
| 12 | DSCHRG SCAP TO COMMS | $>V_{COMMS} + \Delta V$ | X | $v_{batt} < V_{COMMS}$ | OFF | X | OFF | OFF | OFF | ON | Supercap has been charged to a value > $V_{COMMS}$, however, $V_{COMMS}$ is suffcient voltage for COMMS mode. Now turn off boost and discharge supercap through R3 until supercap voltage is close enough to $V_{COMMS}$ so you can connect boost to supercap in Condition 13. |

As an alternative to the boost control plus bypass FET Q1 configuration provided in FIG. 4, use is made of a regulator in the form a buck-boost controller. One embodiment of the invention including regulation provided by a buck-boost controller is shown in FIG. 6, where corresponding features are denoted by corresponding reference characters. FIG. 6 provides a circuit 51 that has the major advantages of:

Relative to the circuit of FIG. 4, FET Q1 and its associated control logic are eliminated.

If the buck-boost converter senses the current flowing into the inductor L1, FET Q3 is no longer required for current control as this is able to be controlled by the converter itself In the embodiment illustrated, the converter used is a LTC3441, which is able to be configured to sense the current flow in the inductor.

If the buck-boost converter senses the current flowing into the inductor L1, PET Q3 may still be included if it is desired to disconnect the supercapacitor from the power source—which, in this embodiment, is the battery—to eliminate supercapacitor leakage currents and balancing circuit current when:

The communications module 24 is in standby mode; and
When the camera phone does not have to be ready to transmit or take a flash photo; and
The buck-boost converter is still enabled.

Alternatively, if the buck-boost converter is not required to be enabled in standby mode, it is possible to disable the buck-boost converter in standby mode to eliminate supercapacitor leakage current. In this case, FET Q3 is omitted and $V_{SCAP}$ is directly connected to $V_{BOOST}$. That is, $V_{SCAP}=V_{BOOST}$.

In those applications where the overall efficiency is of the power supply is not critical, circuit 51 is most advantageous, as there is a slight efficiency cost to pay when $V_{batt}>V_{BOOST}$. Circuit 51 is therefore also suited to electronic equipment where $V_{batt}\leq V_{BOOST}$.

The buck-boost regulator shown in FIG. 6 has internal FETs for switching. In other embodiments, however use is made of other buck-boost regulators, including those with external FETs and/or diodes.

Circuit 51, similarly, to circuit 21, is able to be simplified if the forward voltage required to drive the LED D2 is low enough such that $V_{FLASH}$ is less than the maximum operating voltage for communications module 24. If that condition holds, the following simplifications are made to the power architecture of FIG. 6:

$V_{BOOST}$ is fixed, with $V^{BOOST}=V^{FLASH}=V_{COMMS}$. In this case the voltage reference to the buck-boost converter is fixed, and not controlled by control block 22.

Conditions 7 to 12 in Table 1 are no longer required.

FET Q4 is not required. Referring to FIG. 10, $V^+$ of the communications module 24 is directly connected to $V_{SCAP}$.

In summary, some of the major advantages of the embodiments of the invention are:

A single supercapacitive device is used on the output side of a regulator for supplying a plurality of different voltages supplied by the regulator.

The peak current demand on the power source and the regulator are reduced for a given load. Accordingly the circuit board real estate required by these components is able to be reduced for a given load.

The source current is controlled at all times, not only when the output voltage of the regulator is greater than the input voltages to the regulator.

FIGS. 13 to 16 illustrate embodiments of the invention where a supercapacitor is in series with a battery.

FIG. 13 illustrates an embodiment of the invention in the form of power supply 60, an alternate power supply for cellular telephone 2. In FIG. 13, corresponding reference numerals are used to denote corresponding features from FIG. 3. In this embodiment, supercapacitor 8 is connected in series with battery pack 6. This embodiment is described with reference to a specific configuration where the physical size of the power supply is minimized. In some embodiments along the same lines of power supply 60, similar measures are not taken to minimise size. That is, the general design selection of positioning supercapacitor 8 in series with battery pack 6 is adopted, however with alternate particulars.

The underlying premise for power supply 60 is that batty back 6 is always present and has a continuous power rating. As such, a demanding load—such as circuit 4—should utilise the rated battery power and a supercapacitive device should make up the difference between that and the power required for the load. In aft effort to substantially achieve this, supercapacitor 8 is connected in series intermediate battery pack 6 and circuit 8. Such an approach reduces the risk of stressing battery pack 6 when compared with the known prior art, and accordingly reduces the risk of reducing the lifetime and runtime of the battery. Further, voltage droops that affect the circuit as a whole are substantially avoided. In embodiments where battery pack 6 includes over-current protection, the chances of tripping the inbuilt protection mechanism are also lessened.

For the sake of ibis exemplary embodiment, It is assumed that the effects of supercapacitor 8 are not required for suitable operation of transmitter 3. That is, battery pack 6 is relatively capable of powering transmitter 3, and stress is generally only experienced in relation to powering circuit 4. It will be appreciated that this is a likely situation where a led flash is to be incorporated into a pre-existing phone design. In line with this, supercapacitor 8 is exclusively used in conjunction circuit 4—that is, supercapacitor 8 does not impact upon transmitter 3. The rationale is that, in this particular example, transmitter 3 is not sufficiently demanding to necessitate the assistance of a supercapacitor. In embodiments where this is not so, either supercapacitor 8 or an additional one or more supercapacitor are used to assist in providing the required voltages, currents and/or power to transmitter 3. It will be appreciate that this adds to the physical size of a supply.

The connection of each of the loads to output 7 is selective—transmitter 3 and circuit 4 are mutually exclusively selectively connected to output 7 by way of respective state switches 61 and 62 that progress between the open and closed states. That is, when one of transmitter 3 and driver circuit 4 is connected to output 7, the other is not. Supercapacitor 8 is positioned intermediate switch 63 and switch 61. A further switch 63, which is enabled for synchronised operation with switch 61, serially connects supercapacitor 8 to battery pack 6 when circuit 4 is connected to output 7. As such, when circuit 4 is energised, supercapacitor 8 is connected in series with battery pack 6, in series with driver circuit 4, and in parallel with output 7. As with other examples within the present disclosure, some of the switches are optionally left out of some embodiments. One such example would be to replace switch 62 with a short circuit.

In the present embodiment, supercapacitor 8 is isolated from output 7 when state switch 62 is closed. As a result there is a reduced need for battery pack 6 to supply the leakage current of supercapacitor 8 when transmitter 3 is in use. This should increase the run-time of the battery pack.

As a further advantage of the present embodiment, there is a relatively lower voltage stress on supercapacitor 8 because the required load voltage is made up from the battery as well as the supercapacitor. In addition, the battery provides power, which allows for the use a supercapacitor of lesser capacitance than in some other embodiments. It will be appreciated that some of the above-described embodiments using a supercapacitor in parallel with the battery provide even further reduced stress on the battery. Despite this, the stress on the battery in the present embodiment is sufficient to meet contemporary notions of acceptability, particularly in portable consumer electronic devices, such as telephone 2.

In the above embodiment, the power supply is selectively operable in a plurality of modes, including:
- A first mode wherein regulator 10 powers transmitter 3;
- A second mode wherein regulator 10 charges supercapacitor 8; and
- A third mode wherein the supercapacitor 8 is discharged to power circuit 4.

It will be appreciated at, in this embodiment, the supercapacitor 8 is isolated from battery 6 in the first mode. Also, regulator 10 is isolated from circuit 4 in the third mode. Further, transmitter 3 is isolated from battery 6 in the second and third modes. In some embodiments, transmitter 3 is powered in the second and third modes and there also exists the option to interrupt the second and third modes during transmission by transmitter 3.

FIG. 14 illustrates an alternate embodiment similar to the embodiment FIG. 13, in the form of power supply 110. Like circuit 60, power supply 110 includes an input 5 for connecting to a battery 6 and supercapacitor 8 in series with battery 6. Despite this, power supply 110 includes two outputs, these being:
- A first output 111 for connecting to transmitter 3.
- A second output 7 for connecting to circuit 4.

Although regulator 10 charges supercapacitor 8, a further component, in the form of bypass circuit 112, combines with regulator 10 to define a regulator unit. The regulator unit is operable in a plurality of modes, including:
- A first mode wherein battery 6 powers transmitter 3, through bypass circuit. In this mode switch 115 is closed. It will be appreciated that opening switch 115 isolates transmitter 3.
- A second mode wherein regulator 10 powers transmitter 3. In this mode, switches 113 and 114 are closed, whilst switch 116 is open to isolate circuit 4 from supercapacitor 8.
- A third mode wherein supercapacitor 8 is discharged to power circuit 4.

In the present embodiment, the regulator unit is used in the first mode at all times. That is, battery 6 powers transmitter 3 continuously. The second or third modes are used mutually exclusively with each other—such that charging and discharging are exclusive events—but simultaneously with the first mode.

Power supply 110 generally has the same advantages of power supply 60, however there is no need for controller 9, resulting in additional cost and size advantages. The reasoning is that regulator 10 does not need to supply a plurality of distinct voltages, and merely boosts the voltage provided by battery 6 to a voltage capable of efficiently charging supercapacitor 8 in line with the duty cycle of circuit 4. It will be appreciated that power supply 110 provides a relatively small and efficient solution for operating circuit 4 in conjunction with transmitter 3 without imposing problematic current demands on battery 6.

FIGS. 15 and 16 illustrate exemplary circuits 80 and 100 where the supercapacitor is in series with the battery. Circuits 80 and 100 are alternate circuits to be contained in a cellular telephone.

Circuit 80 includes two loads—an LED flash 81 and a communications module 82. Circuit 80 is powered by a lithium ion battery 83, although in other embodiments alternate power sources are used. A voltage booster 84 operates in conjunction with an inductor 85, a diode 86, a transistor 87, and resistors 88, 89 and 90 to provide the currents necessary for the flash to be generated. A supercapacitor 91 is connected in series with battery 83. In the present embodiment a single cell capacitor is used, however, in other embodiments alternate supercapacitive device are used, such as a plurality of supercapacitors in parallel and/or in series. Circuit 80 also includes a curt control module 92 for flash 81, which operates in conjunction with resistor 93 and a transistor 94.

In this particular example, flash 81 draws about 2 Amps at about 5.5 Volts (inclusive of the voltage drop across the regulator unit—the actual voltage drop across the LED is closer to 5 Volts) to give a flash that is bright enough for the intended camera use. Adjusting resistor 88 allows for the selection of a low charging current this being substantially lower than 2 Amps. Reducing the charging current allows for a reduction in the size of the circuit, given that inductor 85, diode 86 and transistor 87 can be physically smaller and have low current ratings.

A further advantage of a low charging current is that the chance of a significant droop on the battery voltage is reduced. Such a droop often causes problems to other parts of the circuit, and is hence useful to avoid.

Supercapacitor 91, along with the power electronics and charging current are chosen according to the desired duty cycle of the flash 81.

The location of supercapacitor 91 eliminates the inrush current problem, and therefore extra current limiting circuitry is not required as in the case of the typical boost circuit. It will be appreciated that this has space saving benefits, and should reduce associated production costs.

In the present embodiment, the peak battery current is substantially equal to the load current of the flash, being 2A. In a typical boost design, the battery current would be greater than the load current according to:

$$I_{in} = \frac{V_{out} \cdot I_{out}}{V_{in} \cdot \eta}$$

where $\eta$ is efficiency. In the present examples one would expect $V_{out}$=5.5 Volts, $V_{in}$=3.3 Volts, $\eta$=0.85 and $I_{out}$=2 Amps, mindful that battery 83 is a lithium ion battery. As a result, the formula provides that $I_{in}$ would be 3.92 Amps. Those skilled in the art will appreciate that this amount of battery current is generally unacceptable. The situation would be even worse in an example using alkaline batteries, these being attributable to a lower $V_{in}$. Given that the peak battery current in the present example is 2 Amps, which is acceptable, the example of the present embodiment is more desirable.

It will be appreciated that the embodiment of FIG. 14 provides a relatively small circuit that is useful in driving a LED flash in a mobile phone without substantial detrimental effects on a battery.

Circuit 100 differs from circuit 80 in that module 82 is used in conjunction with voltage booster 84. More particularly, boost 84 operates in conjunction with an inductor 85, a diode 86, a transistor 87, and resistors 88, 89 and 90 to provide the currents and voltages necessary for the respective loads. These loads include flash 81 and module 82 respectively. It will be appreciated that, in this embodiment, booster 84 includes a controller such that a plurality of distinctive voltages are supplied in response to the energised load or loads.

Reference is now made to FIG. 18 which illustrates a cellular camera-phone 151 including a prior art power supply in the form of a voltage regulator 152 having an input 153 and an output 154. A power source, in the form of a Li-Ion battery 155, provides to input 153 a batter voltage in the range from about 4.2 Volts when fully charged to about 3.3 Volts just prior to being, in practice, fully discharged. Regulator 152 provides a regulated voltage of about 3.8 Volts to output 154. When the battery voltage at input 153 is greater and less than the regulated voltage, regulator 152 operates in a linear mode and a boost mode respectively. In other embodiments, regulator 152 is a buck regulator and not a linear regulator and, as such, when the battery voltage at input 153 is greater than the regulated voltage regulator 152 operates in a buck mode.

Camera-phone 151 includes, amongst other circuitry, a GPRS power amplifier 156 that, when driving an associated antenna 157, draws a peak current of 1 Amp from output 154. The camera-phone also includes an LED flash circuit 158 having a current controller 159, and an LED 160 that extends between output 154 and controller 159. The controller includes an ENABLE input 161 that, when held in a high state, forward biases LED 160 to allow the production of a flash from that LED. In this embodiment, controller 160 allows up to 350 mA to flow through LED 160 during the production of a flash. Accordingly, the peak current provided by regulator 152 is 1.35 Amps which, when the efficiency of the regulator is taken into account, translates to a peak 2 Amp battery current.

It will be appreciated by a skilled addressee that camera-phone 151 includes other circuitry in addition to that illustrated in FIG. 18. This other circuitry has been omitted for the sake of clearly focussing on the two loads—that is, amplifier 156 and circuit 158—that contribute most significantly to peak battery currents.

Reference is now made to FIG. 19 where corresponding features are denoted by corresponding reference numerals. In particular, camera-phone 151 does not include a prior art power supply such as that provided by FIG. 18, but a power supply 165. More particularly, power supply 165 includes an input 166 that is connected to battery 155 for drawing a load current. In the interest of battery longevity and increased runtimes, the peak battery current is to be limited to 2 Amps or less. Supply 165 includes a first output 167 for connecting to a first load in the form of an LED flash circuit 168, and a second output 169 for connecting to a second load in the form of amplifier 156.

Regulator 152 continues to operate in a linear mode or boost mode, as it does in the FIG. 18 prior art arrangement. However, it will be noted that the regulator is only providing power and current to amplifier 156. The voltage at output 169 is a regulated 3.8 Volts and the peak current available to be drawn is 1.35 Amps. Importantly, this peak current is greater than the available peak current for amplifier 156 in the FIG. 18 embodiment. Accordingly, in comparison to that prior art example, supply 165 is able to provide greater power to amplifier 156, with the consequence of: loss call dropouts; better range from the base station that communication is being established with; and better transmission in low signals areas such as elevators, trains, tunnels etc.

In embodiments where the battery current is to be contained below a threshold higher than the 2 Amp limit mentioned above, it is possible to allow amplifier 156 to draw more than 1.35 Amps. For example, some GPRS amplifiers may need up to 2 Amps, depending upon their efficiency.

Power supply 165 includes a regulator unit in the form of a low current charge pump 170 in parallel with a supercapacitive device in the form of a single cell supercapacitor 171. The supercapacitor is connected in series between input 166 and output 167 and is selectively charged by pump 170 for powering circuit 168 at a maximum voltage of 6.5 Volts. (That is, the sum of the maximum battery voltage of 4.2 Volts and the maximum supercapacitor voltage of 2.3 Volts).

In this embodiment pump 170 operates to fully charge supercapacitor 171 regardless of the state of charge of battery 155. That is, the supercapacitor is charged until the voltage differential between its electrodes is 2.3 Volts. This has the advantage of simplicity, although it will result in higher losses in the supercapacitor as well as perhaps contributing to limit the lifetime for that supercapacitor. In other embodiments supercapacitor 171 is charged such that the high voltage electrode is at a defined voltage. As the battery discharges there is a change in the voltage it provides and, as such, the voltage across the supercapacitor, as applied by pump 170, will increase over the discharge of battery 155. In either case, the voltage across the supercapacitor is controlled to ensure it remains within specification or, if it does not, that that condition will be short lived.

Pump 170 includes an ENABLE input 172 which, when an appropriate voltage signal is applied, activates pump 170 to charge supercapacitor 171.

The combination of pump 170 and supercapacitor 171 are able to supply circuit 168 with a load current that peaks at about 2 Amps, and which over the period of a GPRS pulse averages about 1.5 Amps. Moreover, this is done while simultaneously:

Containing the battery current to less than about 2 Amps.
Operating amplifier 156 to transmit a GPRS signal and draw a load current that peaks at about 1.35 Amps, and which over the period of the GPRS pulse averages about 340 mA.

It will be appreciated from the above description that amplifier 156 is operating for a Class 10 transmission That is, there is a 25% duty cycle at peak current. In other embodiments other classes of transmission are accommodated peak.

Due to the increased current capacity that is available, circuit 168 includes two LEDs 173 and 174 arranged in parallel with each other, and in series with current controller 159. Controller 159 functions to allow current flow, up to a predetermined maximum, to allow a flash of light to be generated from LEDs 173 and 174.

The configuration of supply 165 allows a substantial flash to be generated without overly straining battery 155, regardless of whether or tot the cellular telephone functionality of camera-phone 151 is being used. That is, the user of camera-phone 151 need not stop a call to operate the flash functionality.

During normal operation of the cellular telephone functionality, regulator 152 provides amplifier 156 with the ability to draw up to 1.35 Amps peak current, which is sufficient to allow the required communications signals to be sent, received and processed. In other embodiments more than 1.35 Amps is drawn by amplifier 156 due to the efficiency of the amplifier.

Pump 170 charges supercapacitor 171, if required, either when a telephone call is not being made or, if a call is being made, only when the amplifier is not drawing a peak current pulse. The latter condition is set out in more detail below. More specifically, upon startup of camera-phone 151, pump 170 initially charges supercapacitor 171 and then maintains the supercapacitor in a fully charged state. Clearly, following a flash being provided supercapacitor 171 will be, at least partially discharged.

In other embodiments, pump 170 initially Ages supercapacitor 171 only when the user indicates that a flash from circuit 168 will, or will likely, be required. For example, upon selecting from a menu on the camera-phone's visual display the camera functionality.

It will be noted from FIG. 19 that line 112 is held low—that is, pump 170 is disabled—when a GPRS pulse is being generated by amplifier 156. However, for the remainder of the period of the GPRS signal—in his embodiment this equates to 75% of the period—line 172 is held high and pump 170 is enabled and operable to charge supercapacitor 171.

Once supercapacitor 170 is charged (which in some embodiments will be instantaneously) the user is able to initiate the camera to capture an image. There are then two possible modes of operation of camera-phone 151, these being where the cellular telephone functionality is and is not simultaneously used Looking initially at where the cellular telephone functionality is not being used, this will result in the condition of not(GPRS) being true for both lines 161 and 172. The other conditions for those two lines are the logic opposites and, accordingly, while current is flowing through LEDs 173 and 174 and controller 159, pump 170 will not be active. In this mode the peak and the average current drawn by circuit 168 will be about 2 Amps. That is, each of diodes 173 and 174 will draw about 1 Amp each. An example of such a diode is that manufactured by Lumileds and designated as PWF1 which has a manufacturer's recommended maximum current of 1 Amp. Such a diode, as used in the FIG. 19 embodiment provides a significant flash certainly well in excess of that of the prior art arrangement shown in FIG. 18. More particularly, the FIG. 19 embodiment includes two such LEDs, each of which are able to be driven at 1 Amp peak current.

In the other mode, camera-phone 151 is used simultaneously to capture an image and to drive amplifier 156. Following the logical inputs for lines 161 and 172, the operation will be similar for that in the mode described above. Importantly, however, during the GPRS pulse—that is, the 25% of the time when amplifier 156 is drawing 1.35 Amps—both lines 161 and 172 will go low. That is, for the time in which amplifier 156 demands a peak current, both pump 170 and circuit 168 will be disabled and will draw little if no current. During the other 75% of the cycle, when amplifier 156 is drawing a much smaller current lines 161 is high and a flash is generated by LEDs 173 and 174. Over the period of the GPRS signal, therefore, the flash will be pulsed.

For the above example, even if the cellular telephone functionality is being used the average current available to produce a flash is about 1.5 Amps (averaged over the period of a GPRS pulse) which is significantly more than known to be provided by the prior art. More particularly, in this mode, the FIG. 19 embodiment provides 430% more current than the prior art of FIG. 18, while simultaneously providing 35% more current to amplifier 156. However, if reference is made to the other mode of operation—that is, where the cellular telephone functionality is not being used simultaneously—the increase in current to circuit 168 is even greater.

The above improvements are accomplished by:
Storing the extra energy required for LEDs 173 and 174 in supercapacitor 171.
Only driving LEDs 173 and 174 when there is no GPRS transmission.

It would be understood by a skilled addressee that pulsing the current to the LEDs (that is, pulsing the light provided as a flash) is acceptable because the CMOS exposure time for a typical CCD is in the order of about 100 to 200 ms, and the time for which the current is pulsed off is in the order of only 4.6 ins. As will also be understood by the skilled addressee, it is the integration of light intensity (the total light) that falls on the CMOS sensor that is important not the instantaneous peaks.

It will be noted from the description of the FIG. 19 embodiment that the cellular telephone circuit in the form of amplifier 156 has a high priority and the flash circuit 168 has a low priority. While bot these loads are able to simultaneously operate—notwithstanding that the loads will only mutually exclusively draw respective load currents—the power supply current (being the current that is drawn from battery 155) is contained by ensuring that the load current to circuit 168 is controlled. That is, when a load current (in this case a peak load current) is being drawn by amplifier 156, the load current to circuit 168 is reduced to be substantially zero. That is, at all times the power supply current is maintained below the predetermined threshold. In so far as both the high priority load and the low priority load simultaneously demand load currents that would result in that threshold being exceeded, the low priority load current is reduced. In other embodiments, the low priority load current is reduced to a portion of what would have otherwise been provided in the absence of the high priority load current.

In some embodiments, regulator 152 is omitted and the power input to amplifier 156 is directly connected to battery output 166. During GPRS transmission charging of supercapacitor 8 and/or the Flash Enable are interrupted, so they do not draw current from the battery.

In lower cost embodiments one of LEDs 173 and 174 is omitted. Even in these embodiments, the current available to amplifier 156 is still increased to 1.35 Amps, and the remaining LED is able to be driven as high as the LED manufacturer permits. For known LEDs suitable to this application a typical maximum is 1 Amp peak at 75% duty cycle to give an average current of 750 mA. This represents a 214% improvement (350 mA-750 mA) over the best performing prior art known to the inventors.

In broad terms the solution offered by the FIG. 19 embodiment is efficient timesharing of the battery current to allow effective simultaneous use of two functionalities that would have otherwise demanded too much battery current. The GPRS circuit containing the power amplifier only needs the 2 Amps for 25% of the time, and supply 165 is configured to ensure it receives priority during this lime. The other 75% of the time, however, the LED circuit receives the 2 Amps. Once the flash has been provided (and the corresponding picture taken) then the 75% of time that went to driving the flash circuit is available to recharge the supercapacitor. In this embodiment, the supercapacitor is charged by pump 170 providing a charging current of about 100 mA. However, in other embodiments different charging currents are used. For the sake of completeness it is mentioned that in the FIG. 19 embodiment when both camera and cellular telephone functionality is used, the LEDs are pulsed at 75% duty cycle and the average light output will be 75% of the peak light output.

In other embodiments, power supply 165 includes an additional supercapacitive device in the form a of dual cell supercapacitor (not shown) connected in parallel with the output 138 of regulator 152. This additional supercapacitor functions similarly to supercapacitor 8 in FIG. 1. That is, both the architectures of the embodiments of the invention, as will be discussed below, are able to be used in combination.

In more sophisticated and expensive devices capturing higher quality images, the image capturing system used is synchronised with the LED pulse. That is, no LED current is supplied if a pixel is not being captured. This minimises the energy storage requirement of the supercapacitor, allowing a smaller, thinner, supercapacitor to be used.

FIG. 20 illustrates an embodiment along similar lines to that of FIG. 19, this embodiment taking the form of power supply 180. The Primary point of difference is that, in the embodiment of FIG. 20, battery 155 is free to drive amplifier 156 unencumbered by the operation of a LED flash 181. That is, the performance of the primary telecommunications aspect of camera-phone 151 is not affected by the secondary imaging aspect, at least insofar as the LED flash is concerned.

Power supply 180 includes an input 166 connected to battery 155 for drawing load current. A first output 182 is connected to a first load, in the form of amplifier 156. A second output 183 is connected to a second load, in the form of LED flash 181. A supercapacitor 184 is connected to output 183 for powering LED flash 181. A regulator unit 185 is connected to input 166 for charging supercapacitor 184.

Regulator 185 draws only a low current from battery 155. The magnitude of current is typically determined to be sufficient to allow timely charging of supercapacitor 184, whilst not substantially stressing battery 155 beyond predetermined threshold levels. This notes the constraints mentioned above—for example battery current being limited to a maximum of 2 Amps.

The function of the present power supply is affected by a signal 186. This signal provides two modes:
  A first mode where a switch 187 is open such that LED flash 181 is isolated, and regulator 185 is enabled to charge supercapacitor 184.
  A second mode where switch 187 is closed such that LED flash 181 is enabled, and supercapacitor 184 discharges to power the flash. In this mode regulator 185 is disabled such that it draws no current from battery 155. As a result, LED flash 181 is powered solely by the discharge of supercapacitor 184.

It will be appreciated that such an approach effectively isolates regulator 185, supercapacitor 184 and LED flash 181 from the remainder of the circuitry within phone 151 during use of LED flash 181. That is, the remainder of the phone is unaffected by the power demands associated with use of the flash.

In a similar embodiment, regulator 185 remains enabled in the second mode. That is, in the second mode supercapacitor 184 discharges to power LED flash 181, meanwhile regulator 185 continues to draw a low current to charge supercapacitor 184. In one such case, signal 186 operates only to effect switch 187.

The above embodiments utilise one of two, or a combination of two power supply architectures, these architectures being:
  A supercapacitive device on the load side of a voltage regulator.
  A supercapacitive device in series with the battery.

These architectures are able to be used independently, or in combination within a single power supply. For example, in an embodiment of the invention a power supply includes two loads that are respectively powered by circuits of the first and second architectures respectively. It will be appreciated by a skilled addressee that in some embodiments there is a need to timeshare the supply of power to the loads—as occurs in the FIG. 19 embodiment—to prevent overloading the associated power source.

The second architecture is best applied to those devices having a battery (or other power source) that is able to supply the load current for a given load. Putting the supercapacitive device in series with the battery allows the physical size of the supercapacitive device to be relatively small, as it will be exposed to less than the full load voltage. That is, the voltage across the supercapacitive device (which could be a bank of supercapacitors) will be smaller and hence less series connected supercapacitive cells are required with the supercapacitive device. Moreover, less capacitance is required from the supercapacitive device because the current it cares is limited to that of the load current.

The above two architectures are suitable for many applications, but particularly those where limitations in the existing power supply are apparent. More specifically, the above architectures provide considerable benefit when combined with a load or loads that demands from an associated power source:
  Average power that is no more than the average power capability of the power source.
  Peak power that is greater than the peak power capability of the power source.

Where these two conditions exist the initial enquiry is to the current capacity of the power source. If this is greater than or equal to the peak current required by the load, then the second of the above architecture applies. However, if the current capacity of the power source is less than the peak current requirement of the load, the first of the above architectures applies.

For a given pulse powered load, and relative to not having a supercapacitor in the power supply, the first architecture allows the use of a lower power battery (or other power source) and a smaller capacity voltage regulator. The second architecture allows, for a given battery, the provision of greater peak power to the load.

The embodiments exemplify the above architectures as applied to low power devices. Another example of low power devices is the class of electronic devices powered by low voltage (that is, single or multiple cell) alkaline batteries. This includes, by way of example, portable sound reproduction equipment such as MP3 players, CD players, radios, etc. Other specific examples of low power devices include digital still cameras digital video cameras, cellular telephones, PDAs, pagers, and laptop computers. The invention is also applicable to non-portable devices having a pulsed current load having a limited power supply. For example, the invention is applicable to powering loads within a desktop computer. For while the primary power supply of the computer is connected to the mains supply—in this instance, and in the parlance of the present specification, the maims supply is "the power source" and the primary supply is "the power supply"—there are many components within the computer that have secondary power supplies that separately draw power from the primary power supply and which are limited in the amount of power and or current. That is, if the reference point is the secondary power supply, the primary power supply becomes "the power source" in the parlance of the present specification Examples of electronic devices including secondary power supplies include, a DVD player, a PCMCIA card, a hard drive, or any device that is powered via a USB port of the computer. The substitution of the secondary power supply with a power supply according to the invention allows better use of the average power that is available from the primary power source.

The two architectures mentioned above are also suitable for mid and high power devices. Examples of such applications include UPSs and drive systems for hybrid electric vehicles and electric vehicles.

Although the invention has been described with reference to specific examples, ii will be appreciated by those skilled in the art that it may be embodied in many other forms.

The invention claimed is:

1. A power supply for a cellular telephone having a first load and an LED flash, the power supply including:
   an input for connecting to a power source;
   a first output for connecting to the first load;
   a second output for connecting to the LED flash;
   a supercapacitive device that is connected to the second output for powering the LED flash; and
   a regulator unit connected to the input for charging the supercapacitive device.

2. A power supply according to claim 1 wherein the regulator is in series with the power source, and together these are in parallel with the supercapacitive device.

3. A power supply according to claim 1 wherein the supercapacitive device is in series with the input such that the supercapacitive device and the power source are together in parallel with the LED flash.

4. A power supply according to claim 1 that is operable in a plurality of modes including:
   a charging mode for charging the supercapacitive device; and
   a discharging for discharging the supercapacitive device to power the LED flash.

5. A power supply according to claim 4 wherein the charging and discharging modes operate simultaneously.

6. A power supply according to claim 4 wherein the charging and discharging mode modes selectively operate mutually exclusively.

7. A power supply according to claim 4 wherein the first load is powered irrespective of whether the power supply is in the charging or discharging mode.

8. A power supply according to claim 1 wherein the regulator unit limits the charging current for the supercapacitor to less than a predetermined value.

9. A power supply according to claim 8 wherein the predetermined value is about 2 Amps.

10. A power supply according to claim 8 wherein the predetermined value is about 1 Amp.

11. A power supply according to claim 1 that limits the current drawn from the power source to less than a predetermined value.

12. A power supply according to claim 11 wherein the predetermined value is about 2 Amps.

13. A power supply according to claim 11 wherein the predetermined value is about 1 Amp.

14. A power supply according to claim 1 wherein the first output defines the second output.

15. A power supply according to claim 1 wherein the first output selectively defines the second output.

16. A power supply according to claim 1 wherein the first load is a communications module.

17. A power supply according to claim 1 wherein the first load is a power amplifier.

18. A power supply for an LED flash, the power supply including:
   an input for connecting to a power source that provides an input voltage;
   an output for connecting to the LED flash;
   a supercapacitive device that is connected to output for powering the LED flash; and;
   a regulator unit that boosts the input voltage, the regulator unit being connected to the input for charging the supercapacitive device.

19. A power supply for a plurality of loads that draw respective load currents $I_1, I_2, \ldots I_N$, where $N \geq 2$, the power supply including:
   an input for connecting to a power source that provides a minimum source voltage $V_s$;
   an output for selectively connecting with one or more of the loads for providing the load currents $I_1, I_2, \ldots I_N$ at respective predetermined load voltages $V_1, V_2, \ldots V_N$, wherein $V_1 \neq V_2$, and, $\ldots$, and $V_1 \neq V_N$;
   a supercapacitive device in parallel with the output; and
   a control circuit disposed between the input and the output for selectively applying one of $V_1, V_2, \ldots V_N$ to the output.

20. A power supply according to claim 19 wherein one or more of $V_1, V_2, \ldots$ and $V_N \geq V_s$.

* * * * *